(12) United States Patent
Ono et al.

(10) Patent No.: US 8,457,832 B2
(45) Date of Patent: Jun. 4, 2013

(54) VEHICLE BODY SPEED ESTIMATING DEVICE

(75) Inventors: Eiichi Ono, Toyota (JP); Yumiko Miura, Nagoya (JP); Katsuyuki Yamaguchi, Susono (JP); Taisuke Yasutomi, Atsugi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 448 days.

(21) Appl. No.: 12/677,578

(22) PCT Filed: Sep. 9, 2008

(86) PCT No.: PCT/JP2008/066621
§ 371 (c)(1),
(2), (4) Date: Mar. 11, 2010

(87) PCT Pub. No.: WO2009/035121
PCT Pub. Date: Mar. 19, 2009

(65) Prior Publication Data
US 2010/0198448 A1    Aug. 5, 2010

(30) Foreign Application Priority Data
Sep. 14, 2007 (JP) .................. 2007-239593

(51) Int. Cl.
*G01M 17/00* (2006.01)
*G06F 7/00* (2006.01)
*G06F 19/00* (2011.01)

(52) U.S. Cl.
USPC ............... 701/29.1; 701/26; 701/42; 701/38; 701/70; 701/48; 701/41; 701/91

(58) Field of Classification Search
USPC ............ 701/70, 36, 45, 38, 91; 340/440
See application file for complete search history.

(56) References Cited

U.S. PATENT DOCUMENTS

| 6,654,674 B2 * | 11/2003 | Lu et al. .................... 701/36 |
| 6,714,851 B2 * | 3/2004 | Hrovat et al. .................. 701/70 |

(Continued)

FOREIGN PATENT DOCUMENTS

| GB | 2 388 435 | 11/2003 |
| GB | 2 427 712 | 1/2007 |

(Continued)

OTHER PUBLICATIONS

Shiozawa, Y. et al., "Development of Technique for Estimating Unstable Behavior of Vehicle", Society of Automotive Engineers of Japan, Proceedings of Autumn Symposium, No. 114-20065708, pp. 21-24 (Sep. 27, 2006) (with English abstract and partial English translation).

*Primary Examiner* — Thomas Black
*Assistant Examiner* — Robert Payne
(74) *Attorney, Agent, or Firm* — Oblon, Spivak, McClelland, Maier & Neustadt, L.L.P.

(57) ABSTRACT

A vehicle body speed estimating device. An attitude angle estimating mechanism estimates a roll angle and a pitch angle. A longitudinal speed computing mechanism computes longitudinal vehicle body speed. A vehicle body speed estimator estimates lateral vehicle body speed by using, as state amounts of vehicle motion, the longitudinal vehicle body speed and the lateral vehicle body speed, and on the basis of respective detected values of longitudinal acceleration, lateral acceleration and yaw angular velocity of vehicle motion, and respective estimated values of the roll angle and the pitch angle, and a product of a computed value of the longitudinal vehicle body speed and a value obtained from an absolute value of the detected value of the yaw angular velocity.

8 Claims, 13 Drawing Sheets

U.S. PATENT DOCUMENTS

| | | | |
|---|---|---|---|
| 6,725,140 B2* | 4/2004 | Lu et al. | 701/45 |
| 6,904,350 B2* | 6/2005 | Lu et al. | 701/70 |
| 6,963,797 B2* | 11/2005 | Salib et al. | 701/45 |
| 7,027,902 B2* | 4/2006 | Lu et al. | 701/36 |
| 7,096,103 B2* | 8/2006 | Salib et al. | 701/38 |
| 7,109,856 B2* | 9/2006 | Lu et al. | 340/440 |
| 7,120,528 B2* | 10/2006 | Salib et al. | 701/45 |
| 7,136,730 B2* | 11/2006 | Lu et al. | 701/36 |
| 7,197,388 B2* | 3/2007 | Xu et al. | 701/70 |
| 7,233,236 B2* | 6/2007 | Lu et al. | 340/440 |
| 7,451,032 B2* | 11/2008 | Brown et al. | 701/70 |
| 7,451,033 B2* | 11/2008 | Xu et al. | 701/70 |
| 2004/0024505 A1* | 2/2004 | Salib et al. | 701/38 |
| 2005/0273240 A1 | 12/2005 | Brown et al. | |
| 2005/0288842 A1* | 12/2005 | Brewer et al. | 701/70 |
| 2006/0267750 A1* | 11/2006 | Lu et al. | 340/440 |
| 2008/0059021 A1* | 3/2008 | Lu et al. | 701/36 |
| 2008/0082246 A1* | 4/2008 | Brown et al. | 701/91 |

FOREIGN PATENT DOCUMENTS

| | | |
|---|---|---|
| JP | 62 83247 | 4/1987 |
| JP | 8 332934 | 12/1996 |

\* cited by examiner

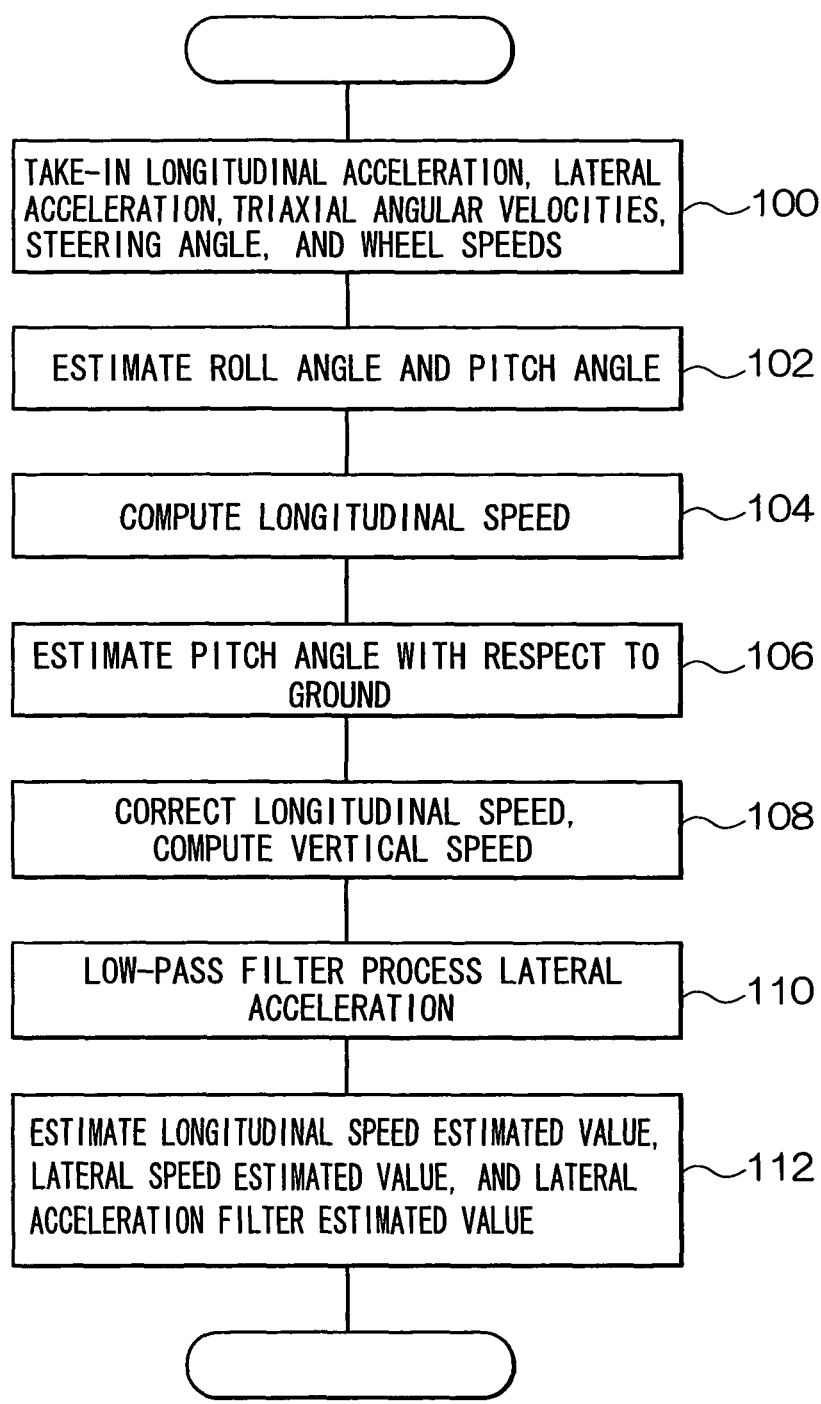

VEHICLE BODY SPEED ESTIMATING DEVICE

BACKGROUND OF THE INVENTION

1. Field of the Invention

The present invention relates to a vehicle body speed estimating device, and in particular, to a vehicle body speed estimating device that estimates lateral vehicle body speed, or longitudinal vehicle body speed and lateral vehicle body speed, by an observer that includes a time-varying parameter, while focusing on the fact that, in a case in which lateral vehicle body speed or longitudinal vehicle body speed and lateral vehicle body speed are made to be the outputs of a motion equation of a rigid body, in which longitudinal vehicle body speed and lateral vehicle body speed are considered to be state amounts and the yaw angular velocity is considered to be a time-varying parameter that varies in accordance with time and is unrelated to the state amounts, the motion equation is an observable object of control.

2. Description of the Related Art

Estimation of a vehicle body slip angle that corresponds to vehicle body lateral speed is conventionally carried out on the basis of a lateral direction vehicle motion model in which the lateral force of the tire is described as a function of the slip angle of the tire. This vehicle motion model uses a motion equation in which the yaw angular velocity and the lateral speed or the slip angle are made to be state amounts. In most cases, the vehicle motion model structures an observer whose output is yaw angular velocity or lateral acceleration.

However, an actual vehicle motion model includes, as a model, the relationship between the slip angle and the lateral force of the tire. Accordingly, in a non-linear region in which the actual vehicle model and the vehicle model that is used do not coincide, complex correction by a correcting means is required, such as correcting the cornering power that is a parameter (Japanese Patent Application Laid-Open (JP-A) No. 62-83247), or switching to an integration technique that does not use a model (JP-A No. 8-332934).

Further, a technique for estimating unstable behavior of a vehicle ("Development of Technique for Estimating Unstable Behavior of Vehicle", Shiozawa et al., Society of Automotive Engineers of Japan, JSAE Paper No. 20065708) is known as a conventional technique for estimating the slip angle on the basis of the longitudinal direction and lateral direction motions of the vehicle body. Based on the assumption that the acceleration that arises at a vehicle body coincides with centrifugal acceleration, this technique is a technique that estimates the direction of the centrifugal acceleration from the value of the longitudinal direction acceleration and the value of the lateral direction acceleration of the vehicle body, and estimates the slip angle from the estimated direction of the centrifugal acceleration.

However, in the techniques of aforementioned JP-A No. 62-83247 and JP-A No. 8-332934, it is not easy to appropriately carry out the above-described complex corrections. Further, if an integration method is continued for a long period of time, problems arise such as estimation is affected by drift errors of the in-vehicle sensors and the accuracy of estimation deteriorates, and the like.

Moreover, in the aforementioned technique of "Development of Technique for Estimating Unstable Behavior of Vehicle", Shiozawa et al., Society of Automotive Engineers of Japan, JSAE Paper No. 20065708, because there is no need to use a vehicle motion model, there is the advantage that estimation is not affected by the road surface on which the vehicle travels. However, because this technique assumes that the acceleration that arises at the vehicle body coincides with centrifugal acceleration, there is the problem that the slip angle cannot be estimated accurately in a situation in which acceleration other than centrifugal acceleration arises, such as at the time of acceleration/deceleration of the vehicle or the like.

SUMMARY OF THE INVENTION

The present invention was made in order to overcome the above-described problems, and an object thereof is to provide a vehicle body speed estimating device that, without using a vehicle motion model that is affected by the road surface on which the vehicle travels, always provides accurate estimation regardless of changes of the road surface on which the vehicle travels, by estimating the vehicle body speed on the basis of a motion equation that uses, as state amounts, longitudinal vehicle body speed and lateral vehicle body speed that serve as rigid body motions of the vehicle body.

In order to achieve the above-described object, a first aspect is structured to include: an attitude angle estimating means that estimates a roll angle and a pitch angle that are attitude angles with respect to a vertical axis of a vehicle body; a longitudinal speed computing means that computes longitudinal vehicle body speed that is vehicle body speed in a vehicle longitudinal direction, on the basis of wheel speeds of respective wheels; and a vehicle body speed estimating means that estimates lateral vehicle body speed that is vehicle body speed in a vehicle lateral direction by using, as state amounts of vehicle motion, the longitudinal vehicle body speed and the lateral vehicle body speed, and on the basis of respective detected values of longitudinal acceleration, lateral acceleration and yaw angular velocity of vehicle motion, and respective estimated values of the roll angle and the pitch angle, and a product of a computed value of the longitudinal vehicle body speed and a value obtained from an absolute value of the detected value of the yaw angular velocity.

Further, a second aspect is structured to include an attitude angle estimating means that estimates a roll angle and a pitch angle that are attitude angles with respect to a vertical axis of a vehicle body; a longitudinal speed computing means that computes longitudinal vehicle body speed that is vehicle body speed in a vehicle, longitudinal direction, on the basis of wheel speeds of respective wheels; and a vehicle body speed estimating means that estimates the longitudinal vehicle body speed and lateral vehicle body speed that is vehicle body speed in a vehicle lateral direction by using, as state amounts of vehicle motion, the longitudinal vehicle body speed and the lateral vehicle body speed, and by using, as a feedback amount, a product of a deviation between a computed value of the longitudinal vehicle body speed and an estimated value of the longitudinal vehicle body speed, and a value obtained from an absolute value of a detected value of a yaw angular velocity, and on the basis of respective detected values of longitudinal acceleration, lateral acceleration and yaw angular velocity of vehicle motion, and respective estimated values of the roll angle and the pitch angle, and a product of the deviation and a value obtained from the absolute value of the detected value of the yaw angular velocity.

The first aspect and the second aspect structure an observer serving as a vehicle body speed estimating means that includes yaw angular velocity as a time-varying parameter that is unrelated to state amounts, and that focuses on the fact that, when a motion equation of a rigid body, in which longitudinal vehicle body speed and lateral vehicle body speed are considered to be state amounts and the yaw angular velocity is considered to be a time-varying parameter that is unrelated to the state amounts, has longitudinal vehicle body speed or lateral vehicle body speed as the output thereof, the motion equation is an observable object of control.

This observer is structured on the basis of a motion equation that uses, as state amounts, the longitudinal vehicle body speed and the lateral vehicle body speed that serve as rigid body motions of the vehicle body, without using a vehicle motion model that is affected by the road surface on which the vehicle travels. Therefore, without being affected by fluctuations of the tire characteristic or the like, and regardless of changes of the road surface on which the vehicle travels, accurate estimation of the vehicle body speed is always possible no matter what the traveling state.

Further, in the case of structuring an observer whose output is the longitudinal vehicle body speed, by making the deviation between the computed value of the longitudinal vehicle body speed computed from the wheel speeds and the estimated value of the longitudinal vehicle body speed estimated at the observer be a feedback amount, robust estimation with respect to the effects of integration errors due to drift of in-vehicle sensors can be carried out.

By making a product, which is obtained by multiplying the deviation between the computed value of the longitudinal vehicle body speed and the estimated value of the longitudinal vehicle body speed by a value obtained from the absolute value of the yaw angular velocity, e.g., a gain that is proportional to the absolute value of the yaw angular velocity (a value that is a predetermined number of times the absolute value), be a feedback amount, the pole arrangement of the observer can always be carried out appropriately without depending on the value of the yaw angular velocity that is a time-varying parameter.

In the first aspect and the second aspect, the vehicle body speed estimating means can be structured as follows by using the inherent characteristic of automobiles that vehicle motion does not stay in the tire non-linear region for a long time.

Namely, the vehicle body speed estimating means of the first aspect can be structured so as to estimate the lateral vehicle body speed by adding, to the state amounts, a value obtained by subjecting the detected value of the lateral acceleration to low-pass filter processing, and by adding a value obtained by subjecting the detected value of the lateral acceleration to low-pass filter processing, and a detected value of a vehicle steering angle.

Further, the vehicle body speed estimating means of the second aspect can be structured so as to estimate the longitudinal vehicle body speed and the lateral vehicle body speed by adding, to the state amounts, a value obtained by subjecting the detected value of the lateral acceleration to low-pass filter processing, and by adding, to the feedback amount, a deviation between a value obtained by subjecting the detected value of the lateral acceleration to low-pass filter processing and an estimated value of the value obtained by low-pass filter processing, and by adding a deviation between the value obtained by low-pass filter processing and the estimated value of the value obtained by low-pass filter processing, and a detected value of a vehicle steering angle.

The feedback works such that the observer output leisurely follows the output of a linear model, by structuring the observer by using the inherent characteristic of automobiles that the vehicle motion does not stay in the tire non-linear region for a long time, i.e., by using a value obtained by subjecting the detected value of the lateral acceleration to low-pass filter processing. Therefore, the phenomenon of diverging from the values of a linear model of the vehicle body slip angle is suppressed, and even in a state of the vehicle traveling straight in which the yaw angular velocity is substantially 0, accurate lateral vehicle body speed, or longitudinal vehicle body speed and lateral vehicle body speed, can be estimated.

A third aspect is structured to include: an attitude angle estimating means that estimates a roll angle and a pitch angle that are attitude angles with respect to a vertical axis of a vehicle body; a longitudinal speed computing means that computes longitudinal vehicle body speed that is vehicle body speed in a vehicle longitudinal direction, on the basis of wheel speeds of respective wheels; and a vehicle body speed estimating means that estimates lateral vehicle body speed that is vehicle body speed in a vehicle lateral direction by using, as state amounts of vehicle motion, the longitudinal vehicle body speed, the lateral vehicle body speed and a value obtained by subjecting a detected value of lateral acceleration to low-pass filtering processing, and on the basis of respective detected values of longitudinal acceleration, lateral acceleration, yaw angular velocity and a vehicle steering angle of vehicle motion, and respective estimated values of the roll angle and the pitch angle, and a corrected value of a computed value of the longitudinal vehicle body speed that is corrected in accordance with an estimated value of a pitch angle with respect to a road surface that is estimated from the detected value of the longitudinal acceleration, and a computed value of vertical vehicle body speed obtained by correcting the computed value of the longitudinal vehicle body speed in accordance with the estimated value of the pitch angle, and a product of a corrected value of a computed value of the longitudinal vehicle body speed and a value obtained from an absolute value of the detected value of the yaw angular velocity, and a value obtained by subjecting the detected value of the lateral acceleration to low-pass filter processing, and a detected value or an estimated value of roll angular velocity, and a detected value or an estimated value of pitch angular velocity.

A fourth aspect is structured to include: an attitude angle estimating means that estimates a roll angle and a pitch angle that are attitude angles with respect to a vertical axis of a vehicle body; a longitudinal speed computing means that computes longitudinal vehicle body speed that is vehicle body speed in a vehicle longitudinal direction, on the basis of wheel speeds of respective wheels; and a vehicle body speed estimating means that estimates the longitudinal vehicle body speed and lateral vehicle body speed that is vehicle body speed in a vehicle lateral direction by using, as state amounts of vehicle motion, the longitudinal vehicle body speed, the lateral vehicle body speed, and a value obtained by subjecting a detected value of lateral acceleration to low-pass filter processing, and by using, as feedback amounts, a product of a first deviation, that is a deviation between a corrected value of a computed value of the longitudinal vehicle body speed that is corrected in accordance with an estimated value of the pitch angle with respect to a road surface that is estimated from a detected value of longitudinal acceleration, and an estimated value of a corrected value of the longitudinal vehicle body speed, and a value obtained from an absolute value of a detected value of a yaw angular velocity, and a second deviation that is a deviation between a value obtained by subjecting the detected value of the lateral acceleration to low-pass filter processing and an estimated value of the value obtained by low-pass filter processing, and on the basis of respective detected values of longitudinal acceleration, lateral acceleration, yaw angular velocity and a vehicle steering angle of vehicle motion, and a computed value of vertical vehicle body speed that is obtained by correcting the detected value of the longitudinal acceleration in accordance with the product, the second deviation and an estimated value of the pitch angle, and respective estimated values of the roll angle and the pitch angle, and a detected value or an estimated value of roll angular, velocity, and a detected value or an estimated value of pitch angular velocity.

The third aspect and the fourth aspect use a corrected value of the computed value of the longitudinal vehicle body speed that is corrected in accordance with the estimated value of the pitch angle with respect to the road surface that is estimated from the detected value of the longitudinal acceleration, and a corrected value of the computed value of the vertical vehicle body speed that is corrected in accordance with the estimated value of the pitch angle with respect to the road surface. Therefore, the effects of vertical vehicle body speed on the vehicle body longitudinal direction and lateral speed direction can be taken into consideration within the observer. Due thereto, the accuracy of estimation is improved even in regions where the pitch angle with respect to ground is large such as traveling at the time of accelerating on an upward slope, or the like. The lateral vehicle body speed, or the longitudinal vehicle body speed and the lateral vehicle body speed, can be estimated accurately.

The present invention can be structured by a program that causes a computer to function as follows. A first program causes a computer to function as: an attitude angle estimating means that estimates a roll angle and a pitch angle that are attitude angles with respect to a vertical axis of a vehicle body; a longitudinal speed computing means that computes longitudinal vehicle body speed that is vehicle body speed in a vehicle longitudinal direction, on the basis of wheel speeds of respective wheels; and a vehicle body speed estimating means that estimates lateral vehicle body speed that is vehicle body speed in a vehicle lateral direction by using, as state amounts of vehicle motion, the longitudinal vehicle body speed and the lateral vehicle body speed, and on the basis of respective detected values of longitudinal acceleration, lateral acceleration and yaw angular velocity of vehicle motion, and respective estimated values of the roll angle and the pitch angle, and a product of a computed value of the longitudinal vehicle body speed and a value obtained from an absolute value of the detected value of the yaw angular velocity.

A second program causes a computer to function as an attitude angle estimating means that estimates a roll angle and a pitch angle that are attitude angles with respect to a vertical axis of a vehicle body; a longitudinal speed computing means that computes longitudinal vehicle body speed that is vehicle body speed in a vehicle longitudinal direction, on the basis of wheel speeds of respective wheels; and a vehicle body speed estimating means that estimates lateral vehicle body speed that is vehicle body speed in a vehicle lateral direction by using, as state amounts of vehicle motion, the longitudinal vehicle body speed, the lateral vehicle body speed and a value obtained by subjecting a detected value of lateral acceleration to low-pass filtering processing, and on the basis of respective detected values of longitudinal acceleration, lateral acceleration, yaw angular velocity and a vehicle steering angle of vehicle motion, and respective estimated values of the roll angle and the pitch angle, and a corrected value of a computed value of the longitudinal vehicle body speed that is corrected in accordance with an estimated value of a pitch angle with respect to a road surface that is estimated from the detected value of the longitudinal acceleration, and a computed value of vertical vehicle body speed obtained by correcting the detected value of the longitudinal acceleration in accordance with the estimated value of the pitch angle, and a product of a corrected value of a computed value of the longitudinal vehicle body speed and a value obtained from an absolute value of the detected value of the yaw angular velocity, and a value obtained by subjecting the detected value of the lateral acceleration to low-pass filter processing, and a detected value or an estimated value of roll angular velocity, and a detected value or an estimated value of pitch angular velocity.

A third program causes a computer to function as an attitude angle estimating means that estimates a roll angle and a pitch angle that are attitude angles with respect to a vertical axis of a vehicle body; a longitudinal speed computing means that computes longitudinal vehicle body speed that is vehicle body speed in a vehicle longitudinal direction, on the basis of wheel speeds of respective wheels; and a vehicle body speed estimating means that estimates the longitudinal vehicle body speed and lateral vehicle body speed that is vehicle body speed in a vehicle lateral direction by using, as state amounts of vehicle motion, the longitudinal vehicle body speed and the lateral vehicle body speed, and by using, as a feedback amount, a product of a deviation between a computed value of the longitudinal vehicle body speed and an estimated value of the longitudinal vehicle body speed, and a value obtained from an absolute value of a detected value of a yaw angular velocity, and on the basis of respective detected values of longitudinal acceleration, lateral acceleration and yaw angular velocity of vehicle motion, and respective estimated values of the roll angle and the pitch angle, and a product of the deviation and a value obtained from the absolute value of the detected value of the yaw angular velocity.

A fourth program causes a computer to function as an attitude angle estimating means that estimates a roll angle and a pitch angle that are attitude angles with respect to a vertical axis of a vehicle body; a longitudinal speed computing means that computes longitudinal vehicle body speed that is vehicle body speed in a vehicle longitudinal direction, on the basis of wheel speeds of respective wheels; and a vehicle body speed estimating means that estimates the longitudinal vehicle body speed and lateral vehicle body speed that is vehicle body speed in a vehicle lateral direction by using, as state amounts of vehicle motion, the longitudinal vehicle body speed, the lateral vehicle body speed, and a value obtained by subjecting a detected value of lateral acceleration to low-pass filter processing, and by using, as feedback amounts, a product of a first deviation, that is a deviation between a corrected value of a computed value of the longitudinal vehicle body speed that is corrected in accordance with an estimated value of the pitch angle with respect to a road surface that is estimated from a detected value of longitudinal acceleration, and an estimated value of a corrected value of the longitudinal vehicle body speed, and a value obtained from an absolute value of a detected value of a yaw angular velocity, and a second deviation that is a deviation between a value obtained by subjecting the detected value of the lateral acceleration to low-pass filter processing and an estimated value of the value obtained by low-pass filter processing, and on the basis of respective detected values of longitudinal acceleration, lateral acceleration, yaw angular velocity and a vehicle steering angle of vehicle motion, and a computed value of vertical vehicle body speed that is obtained by correcting the detected value of the longitudinal acceleration in accordance with the product, the second deviation and an estimated value of the pitch angle, and respective estimated values of the roll angle and the pitch angle, and a detected value or an estimated value of roll angular velocity, and a detected value or an estimated value of pitch angular velocity.

Further, the present invention can be structured as a recording medium that stores at least one of the above-described programs.

As described above, the present invention has the effect that, because an observer is structured without using a vehicle motion model that is affected by the road surface on which the vehicle travels and on the basis of a motion equation that uses, as state amounts, longitudinal speed and lateral speed that serve as rigid body motions of the vehicle body, an accurate vehicle body speed can always be estimated, regardless of changes of the road surface on which the vehicle travels.

BRIEF DESCRIPTION OF THE DRAWINGS

FIG. 13 is a flowchart showing processes in a case of realizing the third exemplary embodiment by a program.

DETAILED DESCRIPTION OF THE INVENTION

Figure 1:
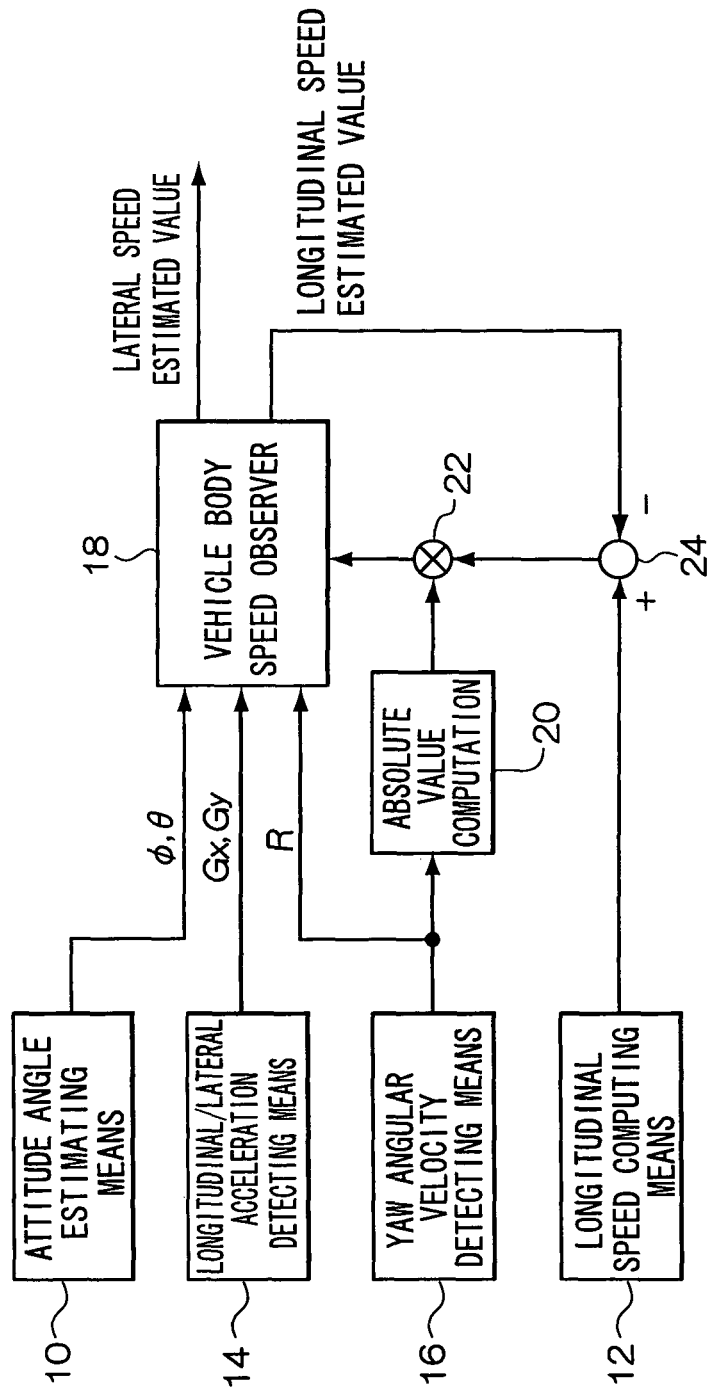
FIG. 1 is a block diagram showing a vehicle body speed estimating device of a first exemplary embodiment.

Exemplary embodiments of the present invention will be described in detail hereinafter with reference to the drawings. As shown in FIG. 1, an attitude angle estimating means 10 that estimates a roll angle and a pitch angle that are attitude angles with respect to a vertical axis of a vehicle body, and a longitudinal speed computing means 12 that computes a longitudinal vehicle body speed U, that is the vehicle body speed in the vehicle longitudinal direction, on the basis of the wheel speeds of the respective wheels, are provided at a vehicle body speed estimating device of a first exemplary embodiment.

The attitude angle estimating means 10 can be structured to include: a longitudinal vehicle body speed estimating means that estimates longitudinal vehicle body speed on the basis of the wheel speeds of the respective wheels; a longitudinal/lateral acceleration state amount deviation computing means that computes the deviation of a longitudinal acceleration state amount and the deviation of a lateral acceleration state amount that arise in accordance with the attitude angles of the vehicle, on the basis of an estimated value of longitudinal vehicle body speed and sensor signals corresponding to detected values of triaxial accelerations that are longitudinal acceleration, lateral acceleration and vertical acceleration of vehicle motion, and triaxial angular velocities that are roll angular velocity, pitch angular velocity and yaw angular velocity of vehicle motion; a low-pass filter carrying out processing to pass only a signal corresponding to a motion to be focused on from a signal expressing the deviation of the longitudinal acceleration state amount and a signal expressing the deviation of the lateral acceleration state amount; and an attitude angle estimating means that estimates the attitude angles on the basis of the sensor signals, a signal expressing the deviation of the longitudinal acceleration state amount after low pass filter processing and a signal expressing the deviation of the lateral acceleration state amount after low pass filter processing.

The wheel speeds of the respective wheels can be detected by wheel speed sensors that are provided in correspondence with the respective wheels. The longitudinal vehicle body speed U can be estimated from the wheel speeds of the respective wheels, or from the wheel speeds of the respective wheels and the differential values of the wheel speeds. For example, at the time of braking, the maximum value of the wheel speeds of the four wheels can be outputted as the longitudinal vehicle body speed U, and at the time of driving, the average value of the wheel speeds of the driven wheels can be outputted as the longitudinal vehicle body speed U. The algorithm that estimates the vehicle body speed in the vehicle longitudinal direction from the wheel speeds is already established in an ABS, and generally, the signal thereof is expressed as $V_{s0}$. When this signal is used, the longitudinal vehicle body speed U that is the vehicle body speed in the vehicle longitudinal direction can be expressed by $V_{s0}$.

Figure 2:
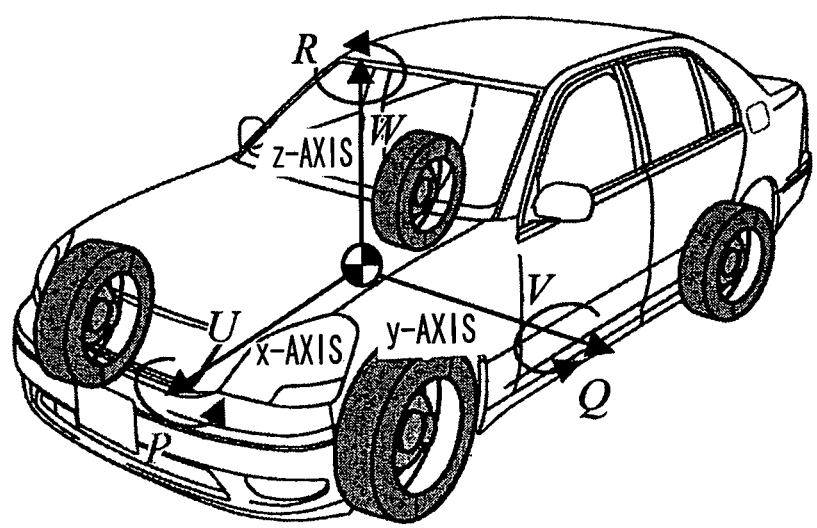
FIG. 2 is an explanatory drawing showing the coordinate system of the present exemplary embodiment.

Further, a longitudinal/lateral acceleration detecting means 14 that is structured by longitudinal/lateral acceleration sensors respectively detecting a lateral acceleration Gy and a longitudinal acceleration Gx that are the xy axis accelerations of the vehicle motion, and a yaw angular velocity sensor 16 that detects, a yaw angular velocity R, are provided at the vehicle body speed estimating device of the present exemplary embodiment. As shown in FIG. 2, the x-axis corresponds to the vehicle longitudinal direction, the y-axis corresponds to the vehicle transverse direction (the lateral direction), and the z-axis corresponds to the vehicle vertical direction.

The attitude angle estimating means 10, the longitudinal/lateral acceleration detecting means 14, and the yaw angular velocity sensor 16 are connected to a vehicle body speed observer 18 serving as a vehicle body speed estimating means that estimates and outputs an estimated value of lateral vehicle body speed and an estimated value of longitudinal vehicle body speed, in accordance with motion equations that will be described later.

The yaw angular velocity sensor 16 is connected to the vehicle body speed observer 18, and is connected to an absolute value computing means 20 that computes the absolute value of the yaw angular velocity. The longitudinal speed computing means 12 is connected to a subtractor 24 that computes a deviation that is a value equal to the computed value of the longitudinal vehicle body speed minus the estimated value of the longitudinal vehicle body speed. The subtractor 24 is connected to a multiplier 22 that computes the product of the absolute value of the yaw angular velocity computed by the absolute value computing means 20 and the deviation computed by the subtractor 24. The multiplier 22 is connected to the vehicle body speed observer 18 so as to feedback, as a feedback amount, the product of the absolute value of the yaw angular velocity and the deviation computed by the subtractor 24.

The attitude angle estimating means 10, the longitudinal speed computing means 12, the absolute value computing means 20, the multiplier 22, the subtractor 24 and the vehicle body speed observer 18 can be structured by one or plural computers or by one or plural electronic circuits that realize the functions of the respective means and the observer and the like.

Next, the estimating of the vehicle body speed (the longitudinal vehicle body speed and the lateral vehicle body speed) by the vehicle body speed observer will be described. The motion equations of a rigid body that express the relationships between the sensor signals, that are outputted from the triaxial sensors that are fixed to the rigid body and detect the triaxial accelerations and the triaxial angular velocities, and the motion state amounts can be described as follows.

$$\dot{U} + QW - RV = g\sin\theta + G_x \quad (1)$$

$$\dot{V} + RU - PW = -g\cos\theta\sin\phi + G_y \quad (2)$$

$$\dot{W} + PV - QU = -g\cos\theta\cos\phi + G_z \quad (3)$$

$$\dot{\phi} = P + Q\sin\phi\tan\theta + R\cos\phi\tan\theta \quad (4)$$

$$\dot{\theta} = Q\cos\phi - R\sin\phi \quad (5)$$

In the above formulas, Gx: longitudinal acceleration, Gy: lateral acceleration, Gz: vertical acceleration, P: roll angular velocity, Q: pitch angular velocity, R: yaw angular velocity, U: longitudinal vehicle body speed, V: lateral vehicle body speed, W: vertical vehicle body speed, $\phi$: roll angle, $\theta$: pitch angle, g: acceleration of gravity. Note that, here, the coordinates are described in a right-hand system in which the upward direction of the vehicle body is the positive direction of the z-axis, and the angles are expressed by Euler angles (see FIG. 2).

In the present exemplary embodiment, the attitude angles of the vehicle body, i.e., the roll angle and the pitch angle of the vehicle body with respect to the vertical axis, are estimated by the attitude angle estimating means 10, and the longitudinal vehicle body speed U and the lateral vehicle body speed V are estimated based on the assumption that these attitude angles are already known. A vehicle body slip angle $\beta$ can be derived on the basis of following formula (6) from the relationship between the longitudinal vehicle body speed U and the lateral vehicle body speed V.

$$\beta = \tan^{-1}\frac{V}{U} \quad (6)$$

Conventional estimation of the vehicle body slip angle will be described next. Conventionally, when estimating the vehicle body slip angle by an observer, usually, the dynamic characteristic of the longitudinal vehicle body speed is ignored, and the vehicle motion model of following formula (7) and formula (8), that assume that the vertical vehicle body speed as well is 0, is used.

$$\dot{V} = -\frac{c_f + c_r}{mU}V - \left(U + \frac{c_f l_f - c_r l_r}{mU}\right)R + \frac{c_f}{m}\delta_f - g\cos\theta\sin\phi \quad (7)$$

$$\dot{R} = -\frac{c_f l_f - c_r l_r}{I_z U}V - \frac{c_f l_f^2 - c_r l_r^2}{I_z U}R + \frac{c_f}{I_z}\delta_f \quad (8)$$

In the above formulas, m: vehicle mass, $c_f$, $c_r$: front and rear wheel cornering powers, $l_f$, $l_r$: distance between longitudinal axis and center of gravity, $\delta_f$: actual steer angle of front wheel, $I_z$: moment of inertia around the z-axis.

Formula (7) is a motion equation that is described such that the lateral acceleration $G_y$ of formula (2) is replaced with a cornering force model. Formula (8) is a motion equation that relates to the yaw angular velocity and that is described by using a cornering force model.

By describing by a model that includes the characteristic of the cornering force in this way, an observable system whose output is the yaw angular velocity R can be described, and an observer that estimates the lateral vehicle body speed can be structured.

However, the lateral vehicle body speed that is estimated here is premised on formula (7) and formula (8) being realized, and there is the problem to be solved that accurate estimation cannot be obtained in a non-linear region where the slip angle is large or on a low $\mu$ road surface where the cornering power varies.

In order to solve this problem, techniques for carrying out non-linear judgment, or switching to a dummy integration method, or the like have also been considered. However, as will be described hereinafter, the present exemplary embodiment, considers an observer structure that does not utilize a model relating to tire generated forces.

Conventionally, above formula (1) that ignores dynamic characteristics includes the term of the lateral vehicle body speed V, and an observer can be structured by utilizing this lateral vehicle body speed. Here, the yaw angular velocity is considered to be an independent parameter, and formula (1) and formula (2) are adjusted as follows. Note that the vertical vehicle body speed W is assumed to be 0, in the same way as conventionally.

$$\frac{d}{dt}\begin{bmatrix}U\\V\end{bmatrix} = \begin{bmatrix}0 & R\\-R & 0\end{bmatrix}\cdot\begin{bmatrix}U\\V\end{bmatrix} + \begin{bmatrix}g\sin\theta + G_x\\-g\cos\theta\sin\phi + G_y\end{bmatrix} \quad (9)$$

Further, considering that the output of the system is the longitudinal vehicle body speed U, i.e., is expressed by following formula (10), formula (9) and formula (10) become an observable system.

$$y = [1\ 0]\cdot\begin{bmatrix}U\\V\end{bmatrix} \quad (10)$$

Note that the longitudinal vehicle body speed U is obtained by the estimated vehicle body speed $V_{so}$ of the ABS as explained previously. Therefore, for example, an observer gain K is expressed by following formula (11) that includes a value obtained from the absolute value of the yaw angular velocity.

$$K = \begin{bmatrix}1.4|R|\\0\end{bmatrix} \quad (11)$$

When the observer gain is expressed as above, the observer is expressed by the following motion equation.

$$\frac{d}{dt}\bar{x} = \begin{bmatrix} 0 & R \\ -R & 0 \end{bmatrix} \cdot \bar{x} + \begin{bmatrix} g\sin\theta + G_x \\ -g\cos\theta\sin\phi + G_y \end{bmatrix} + K \cdot (y - \bar{y}) \quad (12\text{-}1)$$

$$= \left(\begin{bmatrix} 0 & R \\ -R & 0 \end{bmatrix} - K \cdot [1\ 0]\right) \cdot \bar{x} + \begin{bmatrix} g\sin\theta + G_x \\ -g\cos\theta\sin\phi + G_y \end{bmatrix} + K \cdot y \quad (12\text{-}2)$$

$$= \left(\begin{bmatrix} 0 & R \\ -R & 0 \end{bmatrix} - \begin{bmatrix} 1.4|R| \\ 0 \end{bmatrix} \cdot [1\ 0]\right) \cdot \bar{x} + \begin{bmatrix} g\sin\theta + G_x \\ -g\cos\theta\sin\phi - G_y \end{bmatrix} + \begin{bmatrix} 1.4|R| \\ 0 \end{bmatrix} \cdot y \quad (12\text{-}3)$$

$$= \begin{bmatrix} -1.4|R| & R \\ -R & 0 \end{bmatrix} \cdot \bar{x} + \begin{bmatrix} g\sin\theta + G_x \\ -g\cos\theta\sin\phi + G_y \end{bmatrix} + \begin{bmatrix} 1.4|R| \\ 0 \end{bmatrix} \cdot U \quad (12\text{-}4)$$

$$= \begin{bmatrix} -1.4|R| & R \\ -R & 0 \end{bmatrix} \cdot \begin{bmatrix} \tilde{U} \\ \tilde{V} \end{bmatrix} + \begin{bmatrix} g\sin\theta + G_x \\ -g\cos\theta\sin\phi + G_y \end{bmatrix} + \begin{bmatrix} 1.4|R| \\ 0 \end{bmatrix} \cdot U \quad (12\text{-}5)$$

Accordingly, a stable observer (having a second-order Butterworth pole of $\omega=|R|\text{rad/s}$), in which the product of the deviation between the computed value of the longitudinal vehicle body speed and the estimated value of the longitudinal vehicle body speed, and the observer gain that is obtained from the absolute value of the yaw angular velocity, is a feedback amount, can be structured.

The first exemplary embodiment shown in FIG. 1 estimates the longitudinal vehicle body speed and the lateral vehicle body speed by using above formula (12-1). In the present exemplary embodiment, the longitudinal vehicle body speed and the lateral vehicle body speed are made to be the state amounts of the observer, and the longitudinal vehicle body speed and the lateral vehicle body speed are estimated by using the deviation obtained by subtracting the estimated value of the longitudinal vehicle body speed (the observer output) from the computed value of the longitudinal vehicle body speed, and the absolute value of the yaw angular velocity R, and the roll angle $\phi$ and the pitch angle $\theta$ estimated by the attitude angle estimating means 10, and the longitudinal acceleration Gx and the lateral acceleration Gy detected at the longitudinal/lateral acceleration detecting means 14, and the yaw angular velocity R detected at the yaw angular velocity detecting means 16.

Figure 3:
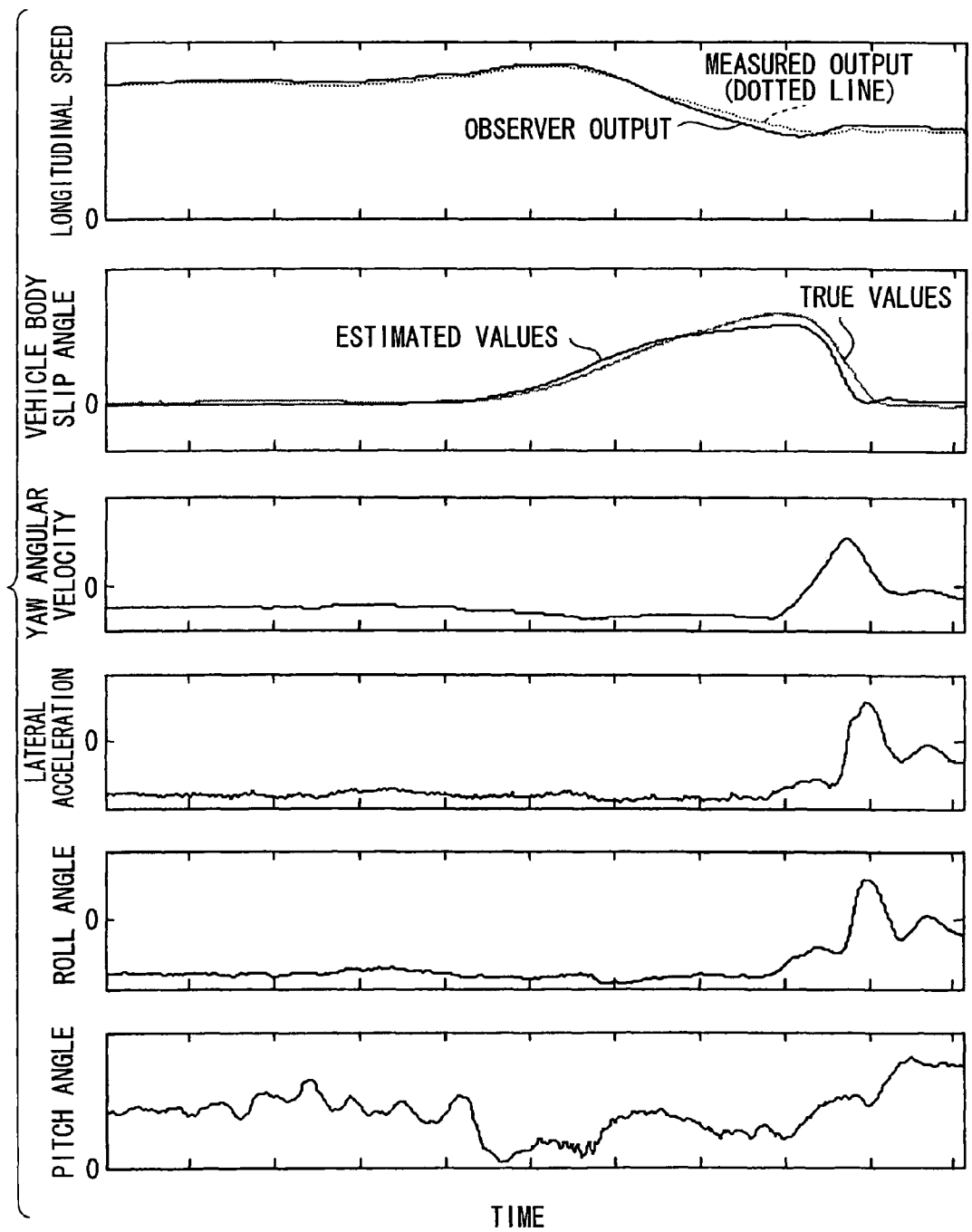
FIG. 3 is a graph showing results of estimation at a time of understeering in the first exemplary embodiment.
Figure 4:
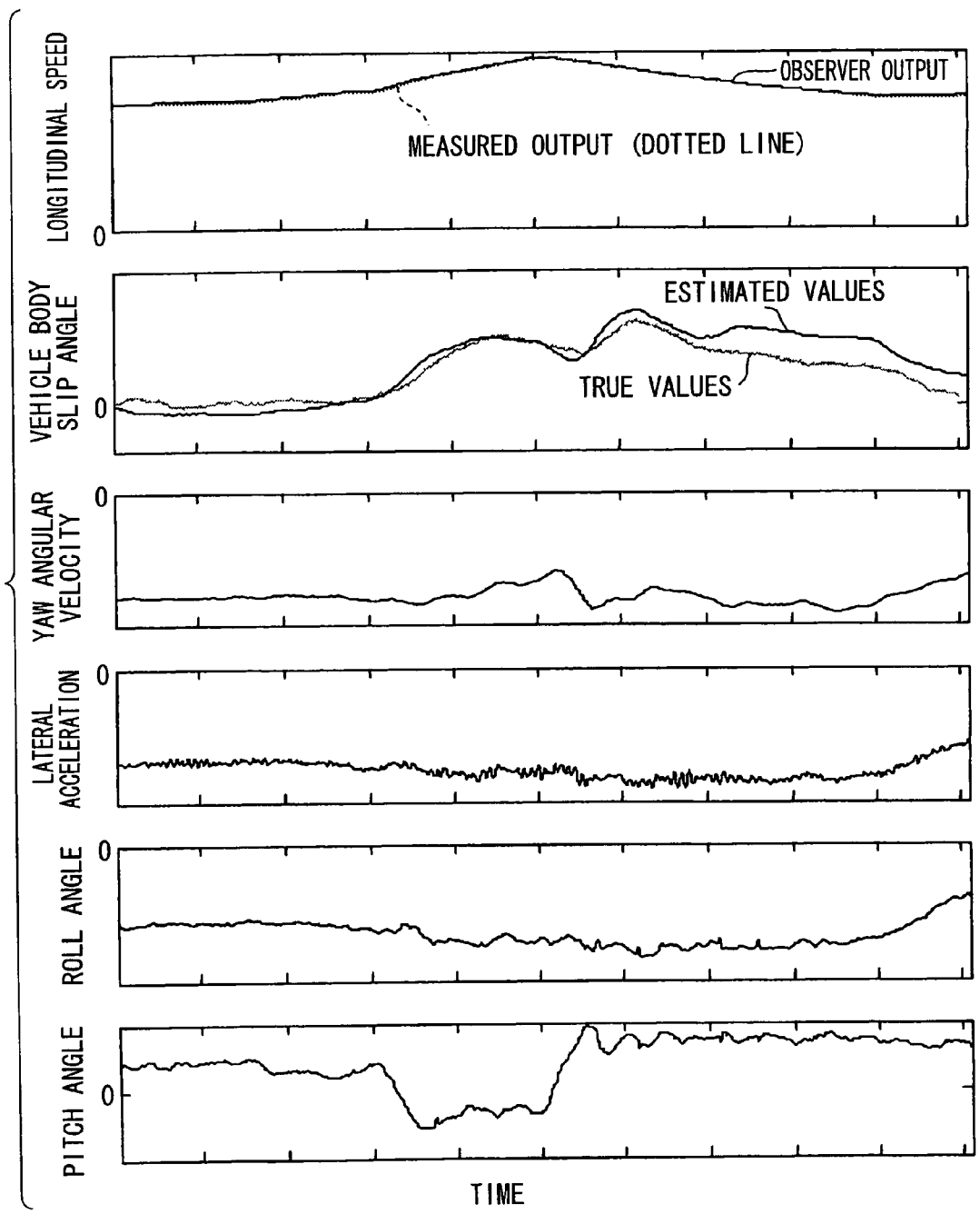
FIG. 4 is a graph showing results of estimation at a time of oversteering in the first exemplary embodiment.

The effects of slip angle estimation by the above-described observer will be described next on the basis of experimental data. FIG. 3 shows the estimation results at the time of oversteering, and FIG. 4 shows the estimation results at the time of understeering. In the estimation results at the time of oversteering of FIG. 3, while turning, the slip angle increases and the speed in the longitudinal direction decreases. Even in a situation that accompanies such a change in the speed in the longitudinal direction, in the present exemplary embodiment, an accurate vehicle body slip angle is estimated because the longitudinal vehicle body speed and the lateral vehicle body speed are estimated accurately.

In the present exemplary embodiment, the observer is structured on the basis of the two motion equations of the longitudinal direction and the lateral direction that describe the rigid body motion of the vehicle body. Therefore, the acceleration/deceleration of the longitudinal speed, that is the state amount of the acceleration/deceleration in the longitudinal direction, and the increase/decrease in the lateral speed, that is the state amount of the lateral direction, can be estimated separately. Thus, the lateral speed can be estimated accurately even at times of vehicle motion that accompanies acceleration/deceleration.

Figure 5:
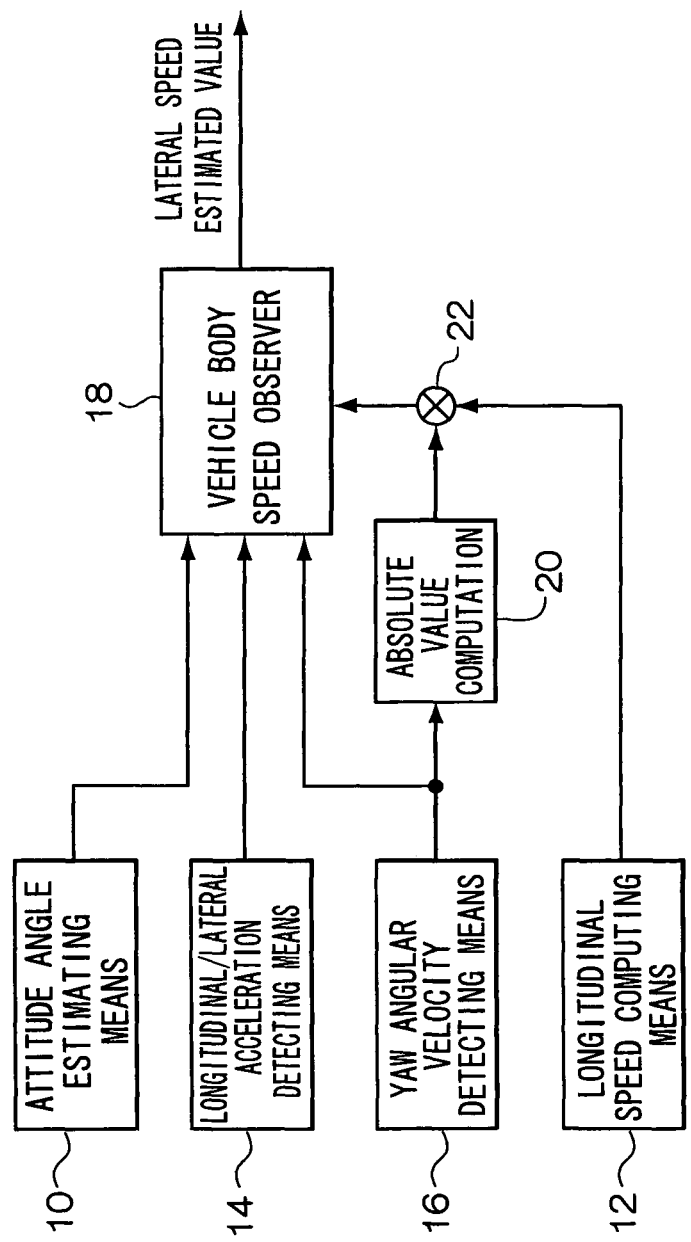
FIG. 5 is a block diagram showing a modified example of the first exemplary embodiment.

A modified example of the above-described first exemplary embodiment will be described next. In this modified example, the lateral vehicle body speed is estimated by using above formula (12-5). Thus, the subtractor 24 for computing the feedback amount in FIG. 1 that illustrates the first exemplary embodiment is omitted, and the longitudinal speed computing means 12 is connected directly to the multiplier 22 as shown in FIG. 5. At the multiplier 22, the product of the absolute value of the yaw angular velocity R and the computed value of the longitudinal vehicle body speed U is computed. The lateral vehicle body speed is estimated at the vehicle body speed observer 18 in accordance with above formula (12-5).

A second exemplary embodiment of the present invention will be described next. The algorithm of the above-described first exemplary embodiment has the feature of structuring an observer whose output is longitudinal direction speed (the longitudinal vehicle body speed) by longitudinal direction and lateral direction motion equations of a rigid body. However, in the present exemplary embodiment, in order to improve accuracy especially at times when the yaw angular velocity that is a time-varying parameter is small, the inherent characteristic of automobiles that "vehicle motion does not stay in the tire non-linear region for a long time" is used in feedback output of the observer.

Here, because the inherent characteristic of automobiles that "vehicle motion does not stay in the tire non-linear region for a long time" is added to the restricting conditions of the observer, a relationship in which both sides of the formula expressed by following formula (13) that expresses "measured value of tire generated force in the lateral direction=model value" are subjected to low-pass filter processing, is added to the system.

$$G_y = -\frac{c_f + c_r}{mV_{s0}}V - \frac{l_f c_f - l_r c_r}{mV_{s0}}R + \frac{c_f}{m}\delta_f \quad (13)$$

In the above formula, m: vehicle mass, $c_f$, $c_r$: front and rear wheel cornering powers, $l_f$, $l_r$: distance between longitudinal axis and center of gravity, $\delta_f$: actual steer angle of front wheel. At this time, a state amount that is obtained by low-pass filter processing the right side, i.e., a value that is obtained by low-pass processing the detected value of the lateral acceleration, is newly added to the state amounts of the observer. Here, this state amount is lateral acceleration filter estimated value $\tilde{g}_{yf}$. At this time, the observer can be described as follows.

$$\frac{d}{dt}\begin{bmatrix} \tilde{U} \\ \tilde{V} \\ \tilde{g}_{yf} \end{bmatrix} = \begin{bmatrix} 0 & R & 0 \\ -R & 0 & 0 \\ 0 & -\frac{c_f + c_r}{mV_{s0}\tau_y} & -\frac{1}{\tau_y} \end{bmatrix} \cdot \begin{bmatrix} \tilde{U} \\ \tilde{V} \\ \tilde{g}_{yf} \end{bmatrix} + \begin{bmatrix} g\sin\theta + G_x \\ -g\cos\theta\sin\phi + G_y \\ -\frac{l_f c_f - l_r c_r}{mV_{s0}\tau_y}R + \frac{c_f}{m\tau_y}\delta_f \end{bmatrix} + K \cdot (y - \bar{y}) \quad (14)$$

$$\tilde{y} = \begin{bmatrix} 1 & 0 & 0 \\ 0 & 0 & 1 \end{bmatrix} \cdot \begin{bmatrix} \tilde{U} \\ \tilde{V} \\ \tilde{g}_{yf} \end{bmatrix} \quad (15)$$

$$y = \begin{bmatrix} V_{s0} \\ g_{yf} \end{bmatrix} \quad (16)$$

In the above formulas, $g_{yf}$ is a value after the lateral acceleration $G_y$ is subjected to the following filter processing.

$$\frac{d}{dt} g_{yf} = -\frac{1}{\tau_y} g_{yf} + \frac{1}{\tau_y} G_y \quad (17)$$

In the above-formula, $\tau_y$ expresses a time constant of from several seconds to greater than or equal to several tens of seconds of the low pass filter that is taken into consideration in above (13).

Further, the observer gain is expressed by following formula (18).

$$K = \begin{bmatrix} 1.4|R| & 0 \\ 0 & K_v \\ 0 & K_g \end{bmatrix} \quad (18)$$

In the above formula, $K_v$, $K_g$ are constants.

Figure 6:
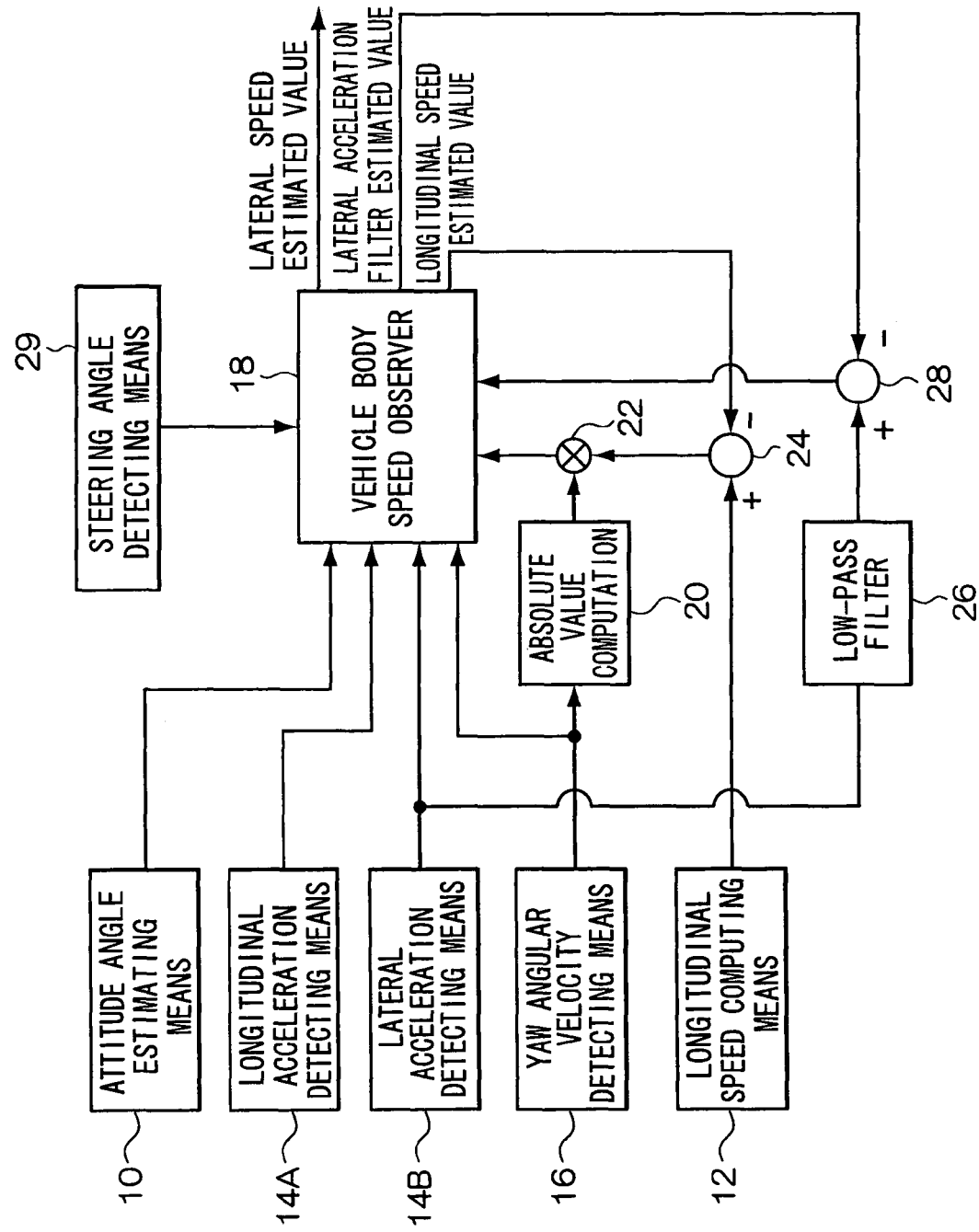
FIG. 6 is a block diagram showing a vehicle body speed estimating device of a second exemplary embodiment.

Accordingly, the second exemplary embodiment, that uses an observer that estimates the longitudinal vehicle body speed and the lateral vehicle body speed in accordance with the motion equation of above formula (14), can be structured as shown in FIG. 6.

The second exemplary embodiment will be described hereinafter. Note that portions in FIG. 6 that correspond to FIG. 1 are denoted by the same reference numerals, and description thereof is omitted.

In the present exemplary embodiment, in order to low-pass filter process the detected value of the lateral acceleration in accordance with above formula (13), instead of the longitudinal/lateral acceleration detecting means 14 of the first exemplary embodiment, there are used a longitudinal acceleration detecting means 14A that is structured by a longitudinal acceleration sensor detecting the longitudinal acceleration, and a lateral acceleration detecting means 14B that is structured by a lateral acceleration sensor detecting the lateral acceleration. A low-pass filter 26 is connected to the lateral acceleration detecting means 14B in order to low-pass filter process the detected value of the lateral acceleration $G_y$.

The low-pass filter 26 is connected to a subtractor 28 that computes a deviation obtained by subtracting the estimated value of the low-pass filter processed value (the estimated value of the value obtained by subjecting the lateral acceleration to low-pass filter processing) from the low-pass filter processed value that is obtained by subjecting the detected value of the lateral acceleration $G_y$ to low-pass filter processing. The subtractor 28 is connected to the vehicle body speed observer 18 so as to input, as a feedback amount, the deviation obtained by subtracting the estimated value of the low-pass filter processed value from the low-pass filter processed value.

Further, a steering angle detecting means 29, that is structured by a steering angle sensor that detects the actual steer angle of front wheel $\delta_f$ is connected to the vehicle body speed observer 18.

In accordance with formula (14), the vehicle body speed observer 18 computes an estimated value of the lateral vehicle body speed, an estimated value of the longitudinal vehicle body speed, and an estimated value of the low-pass filter processed value.

Figure 7:
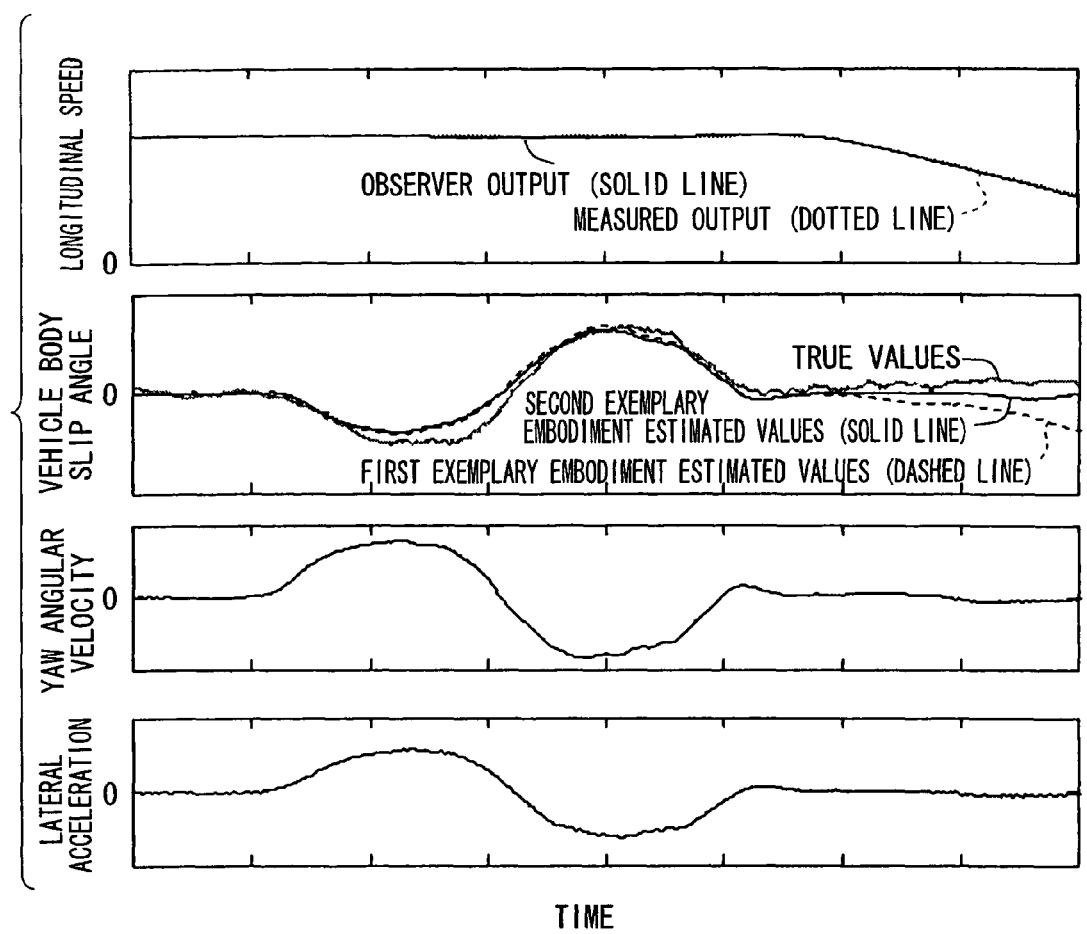
FIG. 7 is a graph showing results of estimation of vehicle body slip angle at a time of traveling while changing, lanes in the second exemplary embodiment, as compared with results of estimation in the first exemplary embodiment.

In order to show the effects of the second exemplary embodiment, FIG. 7 shows the results of vehicle body slip angle estimation at the time of traveling while changing lanes, in comparison with the results of estimation of the first exemplary embodiment.

During a lane change when the yaw angular velocity becomes a large value, the vehicle body slip angle can be estimated accurately in both the first exemplary embodiment and the second exemplary embodiment. However, it can be understood that, in a state of traveling straight when the yaw angular velocity is substantially 0, in the first exemplary embodiment, the feedback of the observer does not work, and the error of the estimated value gradually increases.

In contrast, in the second exemplary embodiment, by using the inherent characteristic of automobiles that "vehicle motion does not stay in the tire non-linear region for a long time", the feedback works such that the observer output leisurely follows the output of a linear model. As a result, the phenomenon of diverging from the values of a linear model of the vehicle body slip angle is suppressed, and also in the state of traveling straight, an accurate value of the vehicle body slip angle is outputted.

A modified example of the second exemplary embodiment will be described next with reference to FIG. 8.

Taking formula (18) into consideration, formula (14) can be described as following formula (19).

$$\frac{d}{dt} \begin{bmatrix} \tilde{U} \\ \tilde{V} \\ \tilde{g}_{yf} \end{bmatrix} = \begin{bmatrix} -1.4|R| & R & 0 \\ -R & 0 & -K_V \\ 0 & -\frac{c_f + c_r}{mV_{s0}\tau_y} & -\frac{1}{\tau_y} - K_g \end{bmatrix} \cdot \begin{bmatrix} \tilde{U} \\ \tilde{V} \\ \tilde{g}_{yf} \end{bmatrix} + \begin{bmatrix} g\sin\theta + G_x \\ -g\cos\theta\sin\phi + G_y \\ -\frac{l_f c_f - l_r c_r}{mV_{s0}\tau_y} R + \frac{c_f}{m\tau_y}\delta_f \end{bmatrix} + \begin{bmatrix} 1.4|R| & 0 \\ 0 & K_v \\ 0 & K_g \end{bmatrix} \cdot y \quad (19)$$

This modified example estimates the lateral vehicle body speed by using above formula (19). The subtractor 24 and the subtractor 28 in FIG. 6 that shows the second exemplary embodiment are omitted. As shown in FIG. 8, the longitudinal speed computing means 12 is connected to the multiplier 22, and the low-pass filter 26 is connected directly to the vehicle body speed observer 18. The vehicle body speed observer 18 estimates the lateral vehicle body speed in accordance with above formula (19).

Figure 9:
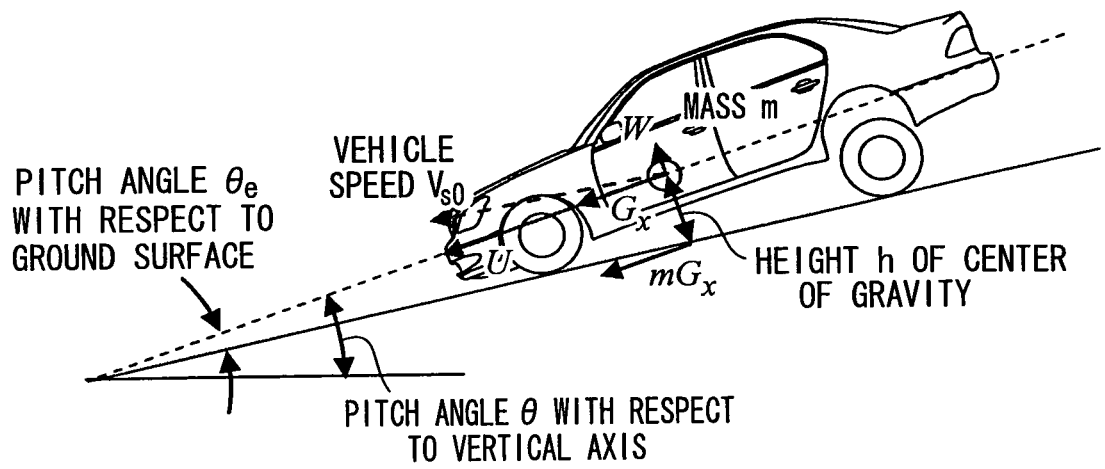
FIG. 9 is an explanatory diagram for explaining a state in which vertical vehicle body speed increases when a pitch angle with respect to ground becomes large.

A third exemplary embodiment of the present invention will be described next. The algorithm of the above-described second exemplary embodiment can estimate the accurate vehicle body slip angle from the accurate vehicle, body longitudinal speed and lateral vehicle body speed being estimated, even in a situation that is accompanied by acceleration/deceleration. However, at times of accelerating on an upward slope or the like, there is the concern that the accuracy of estimation will deteriorate in a region where the pitch angle with respect to ground is large. This is because, as shown in FIG. 9, when a pitch angle with respect to ground $\theta_e$ becomes large, the vertical vehicle body speed W increases, and QW of formula (1) and PW of formula (2) can no longer be ignored.

Here, if the pitch rigidity of the suspension is $k_p$ and the dynamic characteristic relating to pitch motion is ignored, an equation of the following equilibrium with respect to the pitch moment is derived.

$$-hmG_x = k_p \theta_e \quad (20)$$

Here, m: vehicle mass, h: height of center of gravity, $G_x$: sensor signal of detected value of longitudinal acceleration. This describes that the left side of formula (20), that expresses the pitch moment generated by longitudinal force of the tire, is in equilibrium with the right side that expresses the pitch moment generated from the suspension vertical force. From formula (20), the pitch angle with respect to the ground surface can be described by following formula (21).

$$\theta_e = -\frac{hm}{k_p} G_x \quad (21)$$

Further, the longitudinal vehicle body speed U and the vertical vehicle body speed W can be corrected as described in following formula (22) and formula (23), respectively, by using the pitch angle with respect to ground $\theta_e$.

$$U = V_{s0}\cos\theta_e = V_{s0}\cos\left(\frac{hm}{k_p}G_x\right) \quad (22)$$

$$W = V_{s0}\sin\theta_e = -V_{s0}\sin\left(\frac{hm}{k_p}G_x\right) \quad (23)$$

Here, in the same way as in the second exemplary embodiment, the inherent characteristic of automobiles that "vehicle motion does not stay in the tire non-linear region for a long time" is added to the restricting conditions. Therefore, a relationship in which both sides of following formula (24) that expresses "measured value of tire generated force in the lateral direction=model value" are subjected to low-pass filter processing, is added to the system.

$$G_y = -\frac{c_f + c_r}{mV_{s0}}V - \frac{l_f c_f - l_r c_r}{mV_{s0}}R + \frac{c_f}{m}\delta_f \quad (24)$$

In the above formula, the observer is structured by using the relationship between formula (1) and formula (2), without ignoring the vertical vehicle body speed W. In the same way as in the second exemplary embodiment, a state amount that is obtained by low-pass filter processing the right side is newly added to the state amounts of the observer. Here, this state amount is lateral acceleration filter estimated value $\tilde{g}_{yf}$. At this time, the observer can be described as shown by the motion equation of following formula (25).

$$\frac{d}{dt}\begin{bmatrix} \tilde{U} \\ \tilde{V} \\ \tilde{g}_{yf} \end{bmatrix} = \begin{bmatrix} 0 & R & 0 \\ -R & 0 & 0 \\ 0 & -\frac{c_f+c_r}{mV_{s0}\tau_y} & -\frac{1}{\tau_y} \end{bmatrix} \cdot \begin{bmatrix} \tilde{U} \\ \tilde{V} \\ \tilde{g}_{yf} \end{bmatrix} + \begin{bmatrix} -Q\tilde{W} + g\sin\theta + G_x \\ P\tilde{W} - g\cos\theta\sin\phi + G_y \\ -\frac{l_f c_f - l_r c_r}{mV_{s0}\tau_y}R + \frac{c_f}{m\tau_y}\delta_f \end{bmatrix} + K\cdot(y - \tilde{y}) \quad (25)$$

$$\tilde{y} = \begin{bmatrix} 1 & 0 & 0 \\ 0 & 0 & 1 \end{bmatrix} \cdot \begin{bmatrix} \tilde{U} \\ \tilde{V} \\ \tilde{g}_{yf} \end{bmatrix} \quad (26)$$

$$y = \begin{bmatrix} V_{s0}\cos\theta_e \\ g_{yf} \end{bmatrix} \quad (27)$$

In the above formulas, $g_{yf}$ is a value after $G_y$ is subjected to the following filter processing.

$$\frac{d}{dt}g_{yf} = -\frac{1}{\tau_y}g_{yf} + \frac{1}{\tau_y}G_y \quad (28)$$

Further, the observer gain is expressed by following formula (29).

$$K = \begin{bmatrix} 1.4|R| & 0 \\ 0 & K_v \\ 0 & K_g \end{bmatrix} \quad (29)$$

In the above formula, $K_v$, $K_g$ are constants.

The third exemplary embodiment uses an observer that estimates the vehicle body longitudinal speed and the vehicle body lateral speed in accordance with above formula (25), and will be explained with reference to FIG. 10. Note that portions in FIG. 10 that correspond to FIG. 6 are denoted by the same reference numerals, and description thereof is omitted.

A roll angular velocity detecting means 30 that is structured by a roll angular velocity sensor detecting the roll angular velocity of the vehicle, and a pitch angular velocity detecting means 32 that is structured by a pitch angular velocity sensor detecting the pitch angular velocity of the vehicle, are connected to the vehicle body speed observer 18 of the present exemplary embodiment. Note that, instead of the roll angular velocity detecting means, a roll angular velocity estimating means that estimates the roll angular velocity may be used, and, instead of the pitch angular velocity detecting means, a pitch angular velocity estimating means that estimates the pitch angular velocity may be used.

In the present exemplary embodiment, an observer that uses the detected value of the vertical vehicle body speed is structured, which is different than in the above-described exemplary embodiments. Therefore, a computing means that computes the vertical vehicle body speed from the pitch angle with respect to ground and the longitudinal vehicle body speed is provided.

Further, via a pitch angle with respect to ground estimating means 34 that estimates the pitch angle with respect to ground $\theta_e$ in accordance with above formula (21), the longitudinal acceleration detecting means 14A is connected to a corrected value computing means 36 that computes a corrected value of the longitudinal vehicle body speed in accordance with above formula (22) and that computes the vertical vehicle body speed in accordance with above formula (23), on the basis of the longitudinal vehicle body speed $V_{s0}$ computed at the longitudinal speed computing means 12 and the pitch angle with respect to ground $\theta_e$.

The corrected value computing means 36 is connected to the vehicle body speed observer 18 so as to input the vertical vehicle body speed computed from the longitudinal vehicle body speed to the vehicle body speed observer 18, and is connected to a subtractor 38 that computes a deviation which is the corrected value of the longitudinal vehicle body speed minus the estimated value of the corrected value of the longitudinal vehicle body speed. The subtractor 38 is connected to the multiplier 22 that computes the product of the absolute value of the yaw angular velocity R and the deviation computed at the subtract 38.

In the present exemplary embodiment, the longitudinal vehicle body speed and the lateral vehicle body speed are estimated in accordance with above formula (25).

Figure 11:
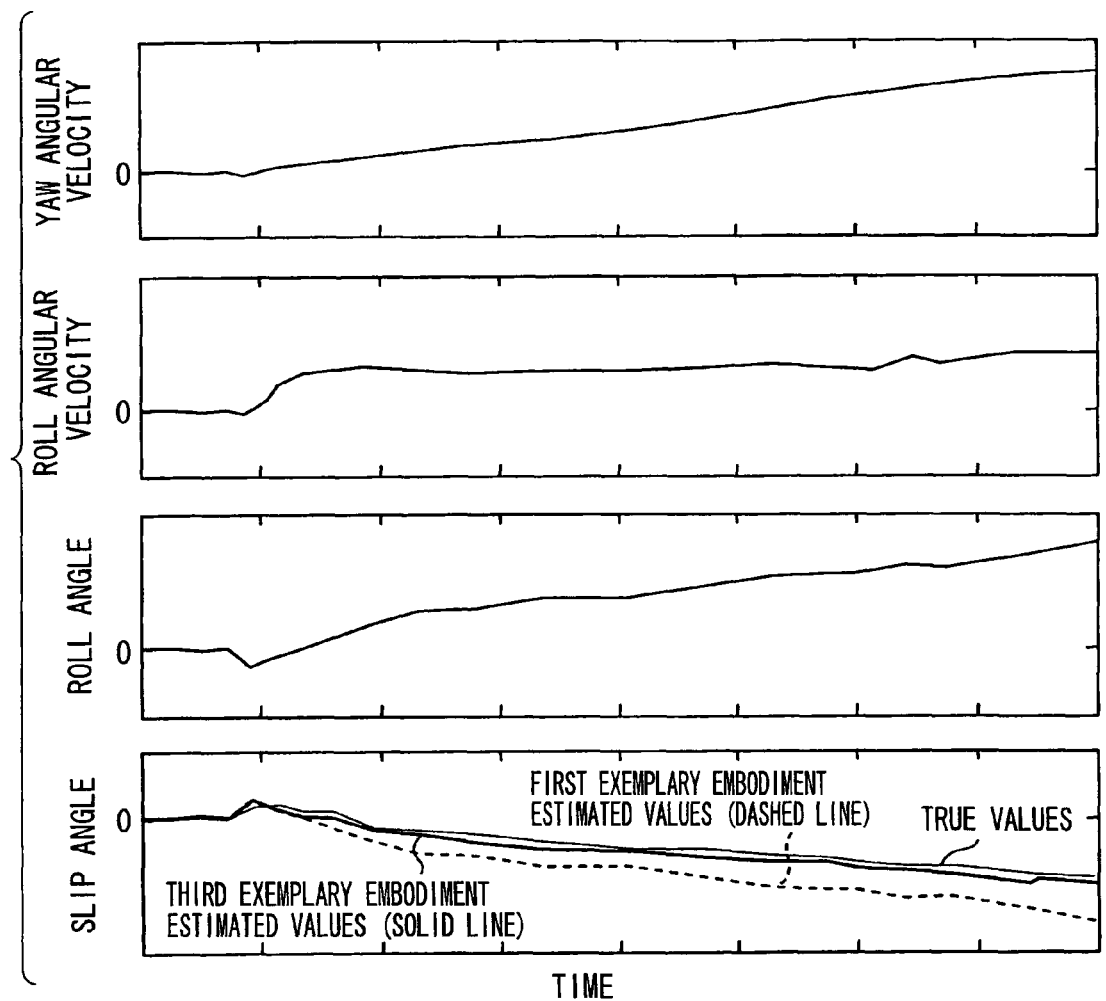
FIG. 11 is a graph showing results of estimation of a vehicle body slip angle at a time when a pitch angle with respect to ground becomes large and increased steering is carried out on a downward slope at which vertical vehicle body speed is a positive value.

FIG. 11 is a drawing showing results of estimation of the vehicle body slip angle at a time when increased steering is carried out on a downward slope at which the vertical vehicle body speed is a positive value. For comparison, the results of estimation in accordance with the first exemplary embodiment are also shown. In this traveling state, the roll angular velocity and the vertical vehicle body speed are both positive values, and therefore, the product of these values as well is a positive value. In the third exemplary embodiment, the lateral vehicle body speed estimating formula is computed as a value that, as compared with the estimating formula in the first exemplary embodiment, is large in the positive direction by an amount that takes into consideration the product of the roll angular velocity and the vertical vehicle body speed. It can be understood that, as a result, an estimated value that is near to the true value can be computed.

A modified example of the third exemplary embodiment will be described next with reference to FIG. 12. Taking above formula (29) into consideration, formula (25) can be described as follows.

$$\frac{d}{dt}\begin{bmatrix} \tilde{U} \\ \tilde{V} \\ \tilde{g}_{yf} \end{bmatrix} = \begin{bmatrix} -1.4|R| & R & 0 \\ -R & 0 & -K_v \\ 0 & -\frac{c_f+c_r}{mV_{s0}\tau_y} & -\frac{1}{\tau_y}-K_g \end{bmatrix} \cdot \begin{bmatrix} \tilde{U} \\ \tilde{V} \\ \tilde{g}_{yf} \end{bmatrix} +$$

$$\begin{bmatrix} -Q\tilde{W}g\sin\theta + G_x \\ P\tilde{W} - g\cos\theta\sin\phi + G_y \\ -\frac{l_f c_f - l_r c_r}{mV_{s0}\tau_y}R + \frac{c_f}{m\tau_y}\delta_f \end{bmatrix} + \begin{bmatrix} 1.4|R| & 0 \\ 0 & K_v \\ 0 & K_g \end{bmatrix} \cdot y$$

(30)

This modified example estimates the vehicle body lateral speed by using above formula (30). The subtractor 38 and the subtractor 28 in FIG. 10 that shows the third exemplary embodiment are omitted. As shown in FIG. 12, the corrected value computing means 36 is connected to the multiplier 22 and inputs the corrected value of the computed value of the longitudinal vehicle body speed to the multiplier 22, and the low-pass filter 26 is connected directly to the vehicle body speed observer 18. The lateral vehicle body speed is estimated at the vehicle body speed observer 18 in accordance with above formula (30).

The above first exemplary embodiment describes that the attitude angle estimating means 10, the longitudinal speed computing means 12, the absolute value computing means 20, the multiplier 22, the subtractor 24 and the vehicle body speed observer 18 can be structured by one or plural computers or by one or plural electronic circuits that realize the functions of the respective means and the observer and the like. In the same way as in the first exemplary embodiment, the second exemplary embodiment and the third exemplary embodiment as well can be structured by one or plural computers or by one or plural electronic circuits that realize the functions of the low-pass filter, the respective means including the pitch with respect to ground computing means and the corrected value computing means, and the observer.

In the above-described third exemplary embodiment, a computer can be made to function as the respective means that are the attitude angle estimating means 10, the longitudinal speed computing means 12, the absolute value computing means 20, the pitch angle with respect to ground estimating means 34, the corrected value computing means 36, and the vehicle body speed observer 18. Information processing in accordance with a program that estimates the lateral vehicle body speed and the longitudinal vehicle body speed by computation, can be realized by the processes shown in the flowchart of FIG. 13.

Note that programs that cause a computer to function as the respective means of the first through third exemplary embodiments or as the respective means of the modified examples of the first and second exemplary embodiments can be realized by processes that are similar to the processes shown in the flowchart of FIG. 13, and therefore, description thereof is omitted.

The computer is structured by a CPU, a ROM and a RAM that are connected to one another by a bus, and an HDD that is connected if needed. The program that estimates the lateral vehicle body speed and the longitudinal vehicle body speed by computation is recorded in the ROM or on a recording medium of the HDD or the like that is connected to the CPU of the computer.

To describe these processes, in step 100, as described above, the longitudinal acceleration, the lateral acceleration, the triaxial angular velocities (the yaw angular velocity, the roll angular velocity, the pitch angular velocity) and the steering angle, that are detected by the longitudinal acceleration detecting means 14A, the lateral acceleration detecting means 14B, the yaw angular velocity detecting means 16, the roll angular velocity detecting means 30, the pitch angular velocity detecting means 32 and the steering angle detecting means 29, respectively, are taken-in. In next step 102, by carrying out computation that is similar to that of the attitude angle estimating means 10, respective estimated values of the roll angle and the pitch angle are estimated. In step 104, the longitudinal vehicle body speed is computed by carrying out computation that is similar to that of the longitudinal speed computing means 12.

In next step 106, the pitch angle with respect to ground $\theta_e$ is computed in accordance with above formula (21) by using the detected value of the longitudinal acceleration. In step 108, the detected value of the longitudinal vehicle body speed is corrected in accordance with above formula (22) and the detected value of the vertical vehicle body speed is computed in accordance with formula (23), by using the computed pitch angle with respect to ground $\theta_e$.

In subsequent step 110, low-pass filter processing is carried out on the detected value of the lateral acceleration detected at the lateral acceleration detecting means 14B. In next step 112, by using the detected values taken-in in step 100 and the values computed in the aforementioned respective steps, estimated values of the respective values obtained by subjecting the detected values of the longitudinal vehicle body speed, the lateral vehicle body speed and the lateral acceleration to low-pass filter processing are computed in accordance with above formula (25).

The deviation of the computed value of the longitudinal vehicle body speed and the estimated value of the longitudinal vehicle body speed can be computed by using the computed value of the current longitudinal vehicle body speed and the estimated value of the longitudinal vehicle body speed of the previous time.

Figure 8:
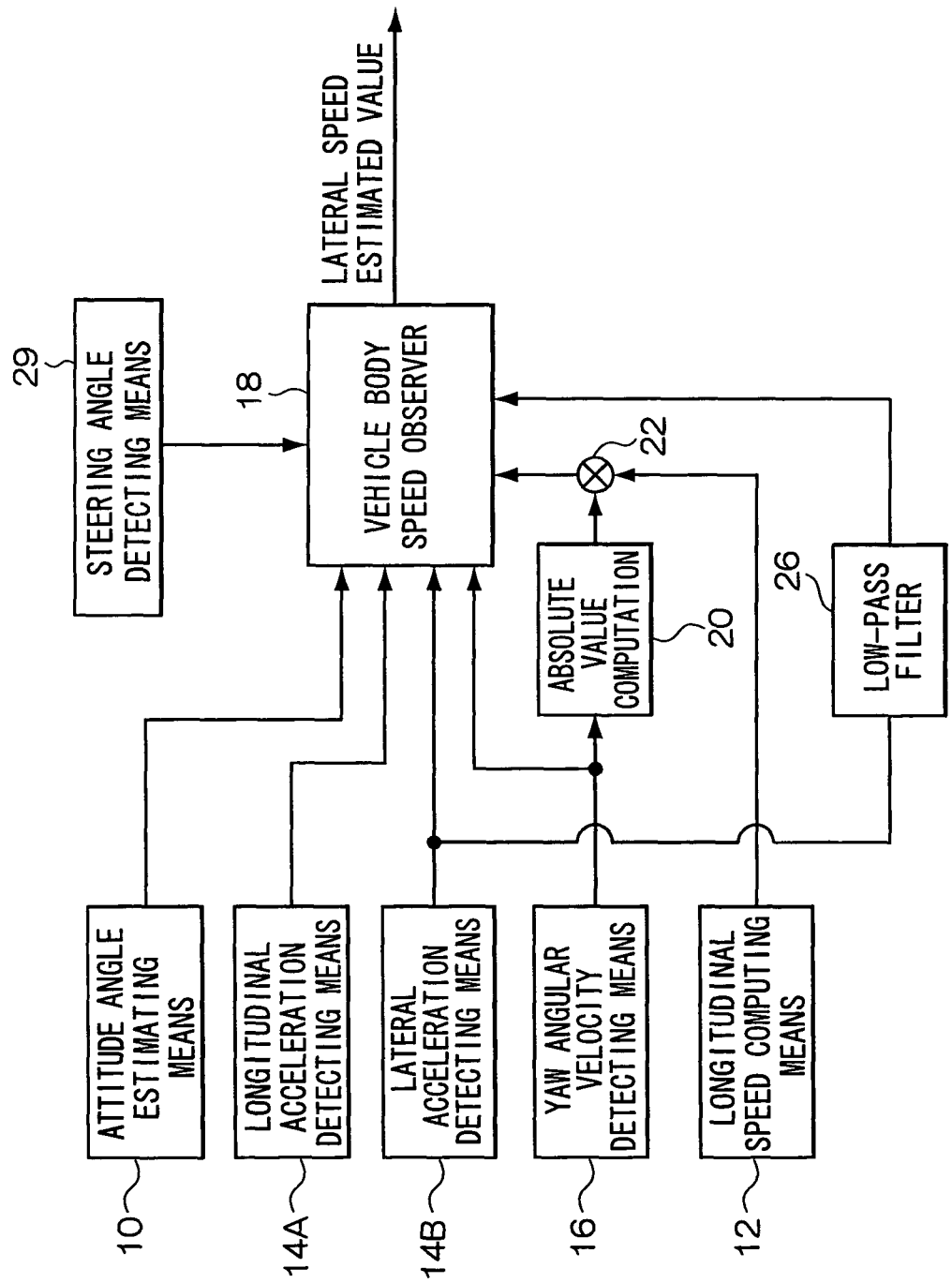
FIG. 8 is a block diagram showing a modified example of the second exemplary embodiment.
Figure 10:
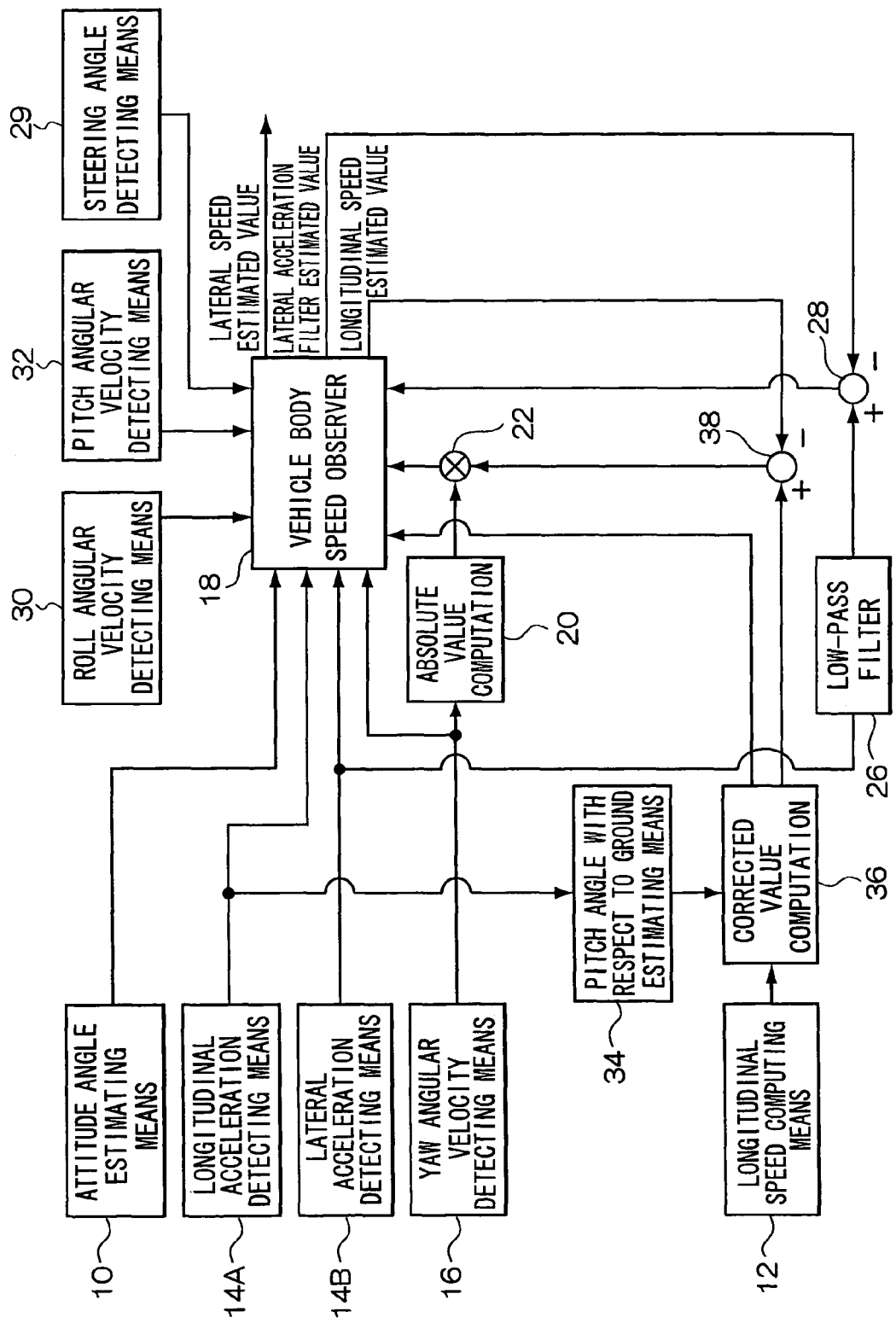
FIG. 10 is a block diagram showing a vehicle body speed estimating device of a third exemplary embodiment.
Figure 12:
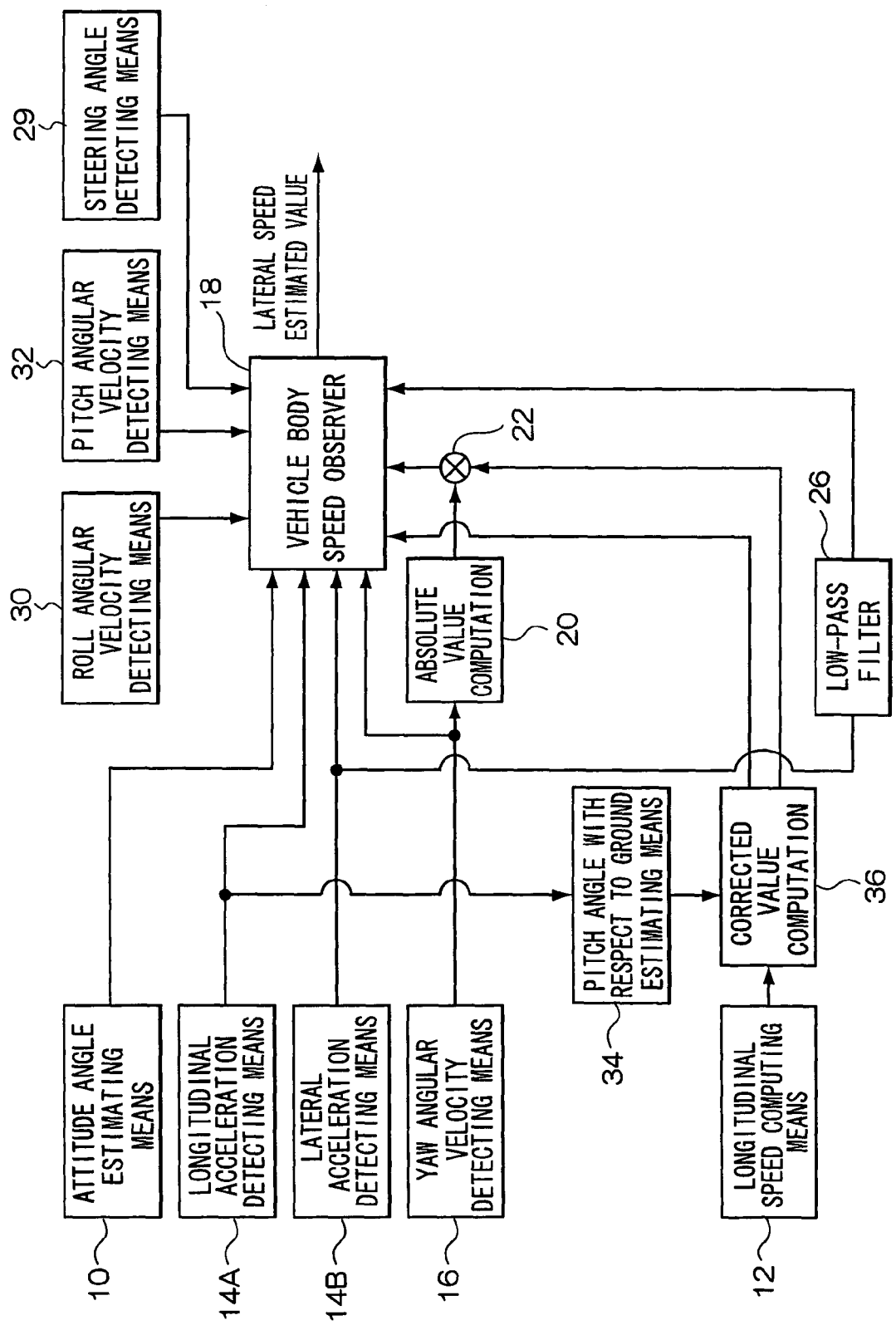
FIG. 12 is a block diagram showing a modified example of the third exemplary embodiment.

Further, above-described FIG. 5, FIG. 8 and FIG. 12 are modifications of FIG. 1, FIG. 6 and FIG. 10, respectively. Longitudinal speed is used as a feedback amount similarly in FIG. 5, FIG. 8 and FIG. 12 as well.

The invention claimed is:

1. A vehicle body speed estimating device comprising:
an attitude angle estimating means that estimates a roll angle and a pitch angle that are attitude angles with respect to a vertical axis of a vehicle body;
a longitudinal speed computing means that computes longitudinal vehicle body speed that is vehicle body speed in a vehicle longitudinal direction, on the basis of wheel speeds of respective wheels; and
a vehicle body speed estimating means that estimates lateral vehicle body speed that is vehicle body speed in a vehicle lateral direction by using, as state amounts of vehicle motion, the longitudinal vehicle body speed and the lateral vehicle body speed, and on the basis of respective detected values of longitudinal acceleration, lateral acceleration and yaw angular velocity of vehicle motion, and respective estimated values of the roll angle and the pitch angle, and a product of a computed value of the longitudinal vehicle body speed and a value obtained from an absolute value of the detected value of the yaw angular velocity,
wherein the vehicle body speed estimating means estimates the lateral vehicle body speed by adding, to the state amounts, a value obtained by subjecting the detected value of the lateral acceleration to low-pass filter processing, and by adding a value obtained by subjecting the detected value of the lateral acceleration to low-pass filter processing, and a detected value of a vehicle steering angle.

2. A vehicle body speed estimating device comprising:
an attitude angle estimating means that estimates a roll angle and a pitch angle that are attitude angles with respect to a vertical axis of a vehicle body;
a longitudinal speed computing means that computes longitudinal vehicle body speed that is vehicle body speed in a vehicle longitudinal direction, on the basis of wheel speeds of respective wheels; and
a vehicle body speed estimating means that estimates lateral vehicle body speed that is vehicle body speed in a vehicle lateral direction by using, as state amounts of vehicle motion, the longitudinal vehicle body speed, the lateral vehicle body speed and a value obtained by subjecting a detected value of lateral acceleration to low-pass filtering processing, and on the basis of respective detected values of longitudinal acceleration, lateral acceleration, yaw angular velocity and a vehicle steering angle of vehicle motion, and respective estimated values of the roll angle and the pitch angle, and a corrected value of a computed value of the longitudinal vehicle body speed that is corrected in accordance with an estimated value of a pitch angle with respect to a road surface that is estimated from the detected value of the longitudinal acceleration, and a computed value of vertical vehicle body speed obtained by correcting the detected value of the longitudinal acceleration in accordance with the estimated value of the pitch angle, and a product of a corrected value of a computed value of the longitudinal vehicle body speed and a value obtained from an absolute value of the detected value of the yaw angular velocity, and a value obtained by subjecting the detected value of the lateral acceleration to low-pass filter processing, and a detected value or an estimated value of roll angular velocity, and a detected value or an estimated value of pitch angular velocity.

3. A vehicle body speed estimating device comprising:
an attitude angle estimating means that estimates a roll angle and a pitch angle that are attitude angles with respect to a vertical axis of a vehicle body;
a longitudinal speed computing means that computes longitudinal vehicle body speed that is vehicle body speed in a vehicle longitudinal direction, on the basis of wheel speeds of respective wheels; and
a vehicle body speed estimating means that estimates the longitudinal vehicle body speed and lateral vehicle body speed that is vehicle body speed in a vehicle lateral direction by using, as state amounts of vehicle motion, the longitudinal vehicle body speed and the lateral vehicle body speed, and by using, as a feedback amount, a product of a deviation between a computed value of the longitudinal vehicle body speed and an estimated value of the longitudinal vehicle body speed, and a value obtained from an absolute value of a detected value of a yaw angular velocity, and on the basis of respective detected values of longitudinal acceleration, lateral acceleration and yaw angular velocity of vehicle motion, and respective estimated values of the roll angle and the pitch angle, and a product of the deviation and a value obtained from the absolute value of the detected value of the yaw angular velocity,
wherein the vehicle body speed estimating means estimates the longitudinal vehicle body speed and the lateral vehicle body speed by adding, to the state amounts, a value obtained by subjecting the detected value of the lateral acceleration to low-pass filter processing, and by adding, to the feedback amount, a deviation between a value obtained by subjecting the detected value of the lateral acceleration to low-pass filter processing and an estimated value of the value obtained by low-pass filter processing, and by adding a deviation between the value obtained by low-pass filter processing and the estimated value of the value obtained by low-pass filter processing, and a detected value of a vehicle steering angle.

4. A vehicle body speed estimating device comprising:
an attitude angle estimating means that estimates a roll angle and a pitch angle that are attitude angles with respect to a vertical axis of a vehicle body;
a longitudinal speed computing means that computes longitudinal vehicle body speed that is vehicle body speed in a vehicle longitudinal direction, on the basis of wheel speeds of respective wheels; and
a vehicle body speed estimating means that estimates the longitudinal vehicle body speed and lateral vehicle body speed that is vehicle body speed in a vehicle lateral direction by using, as state amounts of vehicle motion, the longitudinal vehicle body speed, the lateral vehicle body speed, and a value obtained by subjecting a detected value of lateral acceleration to low-pass filter processing, and by using, as feedback amounts, a product of a first deviation, that is a deviation between a corrected value of a computed value of the longitudinal vehicle body speed that is corrected in accordance with an estimated value of the pitch angle with respect to a road surface that is estimated from a detected value of longitudinal acceleration, and an estimated value of a corrected value of the longitudinal vehicle body speed, and a value obtained from an absolute value of a detected value of a yaw angular velocity, and a second deviation that is a deviation between a value obtained by subjecting the detected value of the lateral acceleration to low-pass filter processing and an estimated value of the value obtained by low-pass filter processing, and on the basis of respective detected values of longitudinal acceleration, lateral acceleration, yaw angular velocity and a vehicle steering angle of vehicle motion, and a computed value of vertical vehicle body speed that is obtained by correcting the detected value of the longitudinal acceleration in accordance with the product, the second deviation and an estimated value of the pitch angle, and respective estimated values of the roll angle and the pitch angle, and a detected value or an estimated value of roll angular velocity, and a detected value or an estimated value of pitch angular velocity.

5. A storage medium readable by a computer, the storage medium storing a program of instructions executable by the computer to perform a function for estimating vehicle body speed, the function comprising the steps of:
estimating a roll angle and a pitch angle that are attitude angles with respect to a vertical axis of a vehicle body;
computing longitudinal vehicle body speed that is vehicle body speed in a vehicle longitudinal direction, on the basis of wheel speeds of respective wheels; and
estimating lateral vehicle body speed that is vehicle body speed in a vehicle lateral direction by using, as state amounts of vehicle motion, the longitudinal vehicle body speed and the lateral vehicle body speed, and on the basis of respective detected values of longitudinal acceleration, lateral acceleration and yaw angular velocity of vehicle motion, and respective estimated values of the roll angle and the pitch angle, and a product of a computed value of the longitudinal vehicle body speed and a value obtained from an absolute value of the detected value of the yaw angular velocity,
wherein estimating the lateral vehicle body speed includes adding, to the state amounts, a value obtained by subjecting the detected value of the lateral acceleration to low-pass filter processing.

6. A storage medium readable by a computer, the storage medium storing a program of instructions executable by the computer to perform a function for estimating vehicle body speed, the function comprising the steps of:
estimating a roll angle and a pitch angle that are attitude angles with respect to a vertical axis of a vehicle body;
computing longitudinal vehicle body speed that is vehicle body speed in a vehicle longitudinal direction, on the basis of wheel speeds of respective wheels; and
estimating lateral vehicle body speed that is vehicle body speed in a vehicle lateral direction by using, as state amounts of vehicle motion, the longitudinal vehicle body speed, the lateral vehicle body speed and a value obtained by subjecting a detected value of lateral acceleration to low-pass filtering processing, and on the basis of respective detected values of longitudinal acceleration, lateral acceleration, yaw angular velocity and a vehicle steering angle of vehicle motion, and respective estimated values of the roll angle and the pitch angle, and a corrected value of a computed value of the longitudinal vehicle body speed that is corrected in accordance with an estimated value of a pitch angle with respect to a road surface that is estimated from the detected value of the longitudinal acceleration, and a computed value of vertical vehicle body speed obtained by correcting the detected value of the longitudinal acceleration in accordance with the estimated value of the pitch angle, and a product of a corrected value of a computed value of the longitudinal vehicle body speed and a value obtained from an absolute value of the detected value of the yaw angular velocity, and a value obtained by subjecting the detected value of the lateral acceleration to low-pass filter processing, and a detected value or an estimated value of roll angular velocity, and a detected value or an estimated value of pitch angular velocity.

7. A storage medium readable by a computer, the storage medium storing a program of instructions executable by the computer to perform a function for estimating vehicle body speed, the function comprising the steps of:
estimating a roll angle and a pitch angle that are attitude angles with respect to a vertical axis of a vehicle body;
computing longitudinal vehicle body speed that is vehicle body speed in a vehicle longitudinal direction, on the basis of wheel speeds of respective wheels; and
estimating the longitudinal vehicle body speed and lateral vehicle body speed that is vehicle body speed in a vehicle lateral direction by using, as state amounts of vehicle motion, the longitudinal vehicle body speed and the lateral vehicle body speed, and by using, as a feedback amount, a product of a deviation between a computed value of the longitudinal vehicle body speed and an estimated value of the longitudinal vehicle body speed, and a value obtained from an absolute value of a detected value of a yaw angular velocity, and on the basis of respective detected values of longitudinal acceleration, lateral acceleration and yaw angular velocity of vehicle motion, and respective estimated values of the roll angle and the pitch angle, and a product of the deviation and a value obtained from the absolute value of the detected value of the yaw angular velocity,
wherein estimating the longitudinal vehicle body speed and the lateral vehicle body speed includes adding, to the state amounts, a value obtained by subjecting the detected value of the lateral acceleration to low-pass filter processing.

8. A storage medium readable by a computer, the storage medium storing a program of instructions executable by the computer to perform a function for estimating vehicle body speed, the function comprising the steps of:
estimating a roll angle and a pitch angle that are attitude angles with respect to a vertical axis of a vehicle body;
computing longitudinal vehicle body speed that is vehicle body speed in a vehicle longitudinal direction, on the basis of wheel speeds of respective wheels; and
estimating the longitudinal vehicle body speed and lateral vehicle body speed that is vehicle body speed in a vehicle lateral direction by using, as state amounts of vehicle motion, the longitudinal vehicle body speed, the lateral vehicle body speed, and a value obtained by subjecting a detected value of lateral acceleration to low-pass filter processing, and by using, as feedback amounts, a product of a first deviation, that is a deviation between a corrected value of a computed value of the longitudinal vehicle body speed that is corrected in accordance with an estimated value of the pitch angle with respect to a road surface that is estimated from a detected value of longitudinal acceleration, and an estimated value of a corrected value of the longitudinal vehicle body speed, and a value obtained from an absolute value of a detected value of a yaw angular velocity, and a second deviation that is a deviation between a value obtained by subjecting the detected value of the lateral acceleration to low-pass filter processing and an estimated value of the value obtained by low-pass filter processing, and on the basis of respective detected values of longitudinal acceleration, lateral acceleration, yaw angular velocity and a vehicle steering angle of vehicle motion, and a computed value of vertical vehicle body speed that is obtained by correcting the detected value of the longitudinal acceleration in accordance with the product, the second deviation and an estimated value of the pitch angle, and respective estimated values of the roll angle and the pitch angle, and a detected value or an estimated value of roll angular velocity, and a detected value or an estimated value of pitch angular velocity.

* * * * *